United States Patent
Li

(10) Patent No.: US 7,395,210 B2
(45) Date of Patent: Jul. 1, 2008

(54) PROGRESSIVE TO LOSSLESS EMBEDDED AUDIO CODER (PLEAC) WITH MULTIPLE FACTORIZATION REVERSIBLE TRANSFORM

(75) Inventor: Jin Li, Sammamish, WA (US)

(73) Assignee: Microsoft Corporation, Redmond, WA (US)

(*) Notice: Subject to any disclaimer, the term of this patent is extended or adjusted under 35 U.S.C. 154(b) by 965 days.

(21) Appl. No.: 10/300,995

(22) Filed: Nov. 21, 2002

(65) Prior Publication Data
US 2004/0102963 A1   May 27, 2004

(51) Int. Cl.
   G10L 19/00 (2006.01)
   G10L 21/00 (2006.01)
(52) U.S. Cl. .............. 704/500; 704/503; 704/200.1; 704/203; 704/205
(58) Field of Classification Search .......... 704/200.1, 704/500, 503, 203, 205
   See application file for complete search history.

(56) References Cited

U.S. PATENT DOCUMENTS

| | | | |
|---|---|---|---|
| 5,703,799 A * | 12/1997 | Ohta | 708/402 |
| 6,219,458 B1 * | 4/2001 | Zandi et al. | 382/248 |
| 6,466,699 B1 * | 10/2002 | Schwartz et al. | 382/244 |
| 6,757,648 B2 * | 6/2004 | Chen et al. | 704/203 |
| 6,792,155 B2 * | 9/2004 | Schwartz et al. | 382/244 |
| 6,934,676 B2 * | 8/2005 | Wang et al. | 704/200.1 |
| 7,013,049 B2 * | 3/2006 | Sakuyama | 382/240 |
| 7,068,849 B2 * | 6/2006 | Zandi et al. | 382/240 |
| 7,275,036 B2 * | 9/2007 | Geiger et al. | 704/500 |
| 7,315,822 B2 * | 1/2008 | Li | 704/500 |
| 2001/0031096 A1 * | 10/2001 | Schwartz et al. | 382/250 |
| 2002/0009235 A1 * | 1/2002 | Schwartz et al. | 382/244 |
| 2002/0048405 A1 * | 4/2002 | Zandi et al. | 382/232 |

OTHER PUBLICATIONS

"Reversible Discrete Cosine Transform", Komatsu et al., May 12-15, 1998, Proceedings of the 1998 IEEE International Conference on Acoustics, Speech, and Signal Processing, vol. 3, pp. 1769-1772.*
Li, "Low noise reversible MDCT (RMDCT) and its application in progressive-to-lossless embedded audio coding", IEEE Transactions on Signal Processing, vol. 53, Issue 5, May 2005, pp. 1870-1880.*
A. Zandi et al. "CREW: Compression with Reversible Embeded Wavelets", Proceedings DCC 95, Data Compression Conference, Mar. 28-30, 1995, pp. 212-221.*
P. Noll, MPEG Digital Audio Coding, pp. 59-81, IEEE Signal Processing Magazine, 1997.

(Continued)

*Primary Examiner*—David Hudspeth
*Assistant Examiner*—Abdelali Serrou
(74) *Attorney, Agent, or Firm*—Amin, Turocy & Calvin, LLP

(57) ABSTRACT

A system and method for lossless and/or progressive to lossless data coding (e.g., audio and/or image) is provided. The system and method employ a multiple factorization reversible transform component that provides quantized coefficients based, at least in part, upon a multiple factorization reversible transform. The multiple factorization reversible transform component can employ an N-point modulated lapped transform in accordance with one aspect of the present invention. The multiple factorization reversible transform component can comprise a modulation stage, a pre-FFT rotation stage, a complex FFT stage and a post-FFT rotation stage.

52 Claims, 15 Drawing Sheets

OTHER PUBLICATIONS

S. R. Quackenbush, Coding of Natural Audio in MPEG-4, 1998, pp. 3797-3800, vol. 6, 1998 IEEE International Conference on Acoustics, Speech and Signal Processing.

Richard J. Beaton et al.; "Objective Perceptual Measurement of Audio Quality", Collected Papers on Digital Audio Bit-Rate Reduction, pp. 126-152, Feb. 15, 1996.

Tilman Liebchen et al.; "Lossless Transform Coding of Audio Signals", pp. 1-10, 1997.

Takehiro Moriya et al.; "Lossless Scalable Audio Coder and Quality Enhancement", pp. 1829-1832, 2002.

Al Wegener; "Musicompress: Lossless, Low-MIPS Audio Compression in Software and Hardware", 1997.

Kunitoshi Komatsu et al.; "Reversible Discrete Cosine Transform", 1998.

Ralf Geiger et al.; "INTMDCT a A Link Between Perceptual and Lossless Audio Coding", 1998.

Jin Li; "Embedded Audio Coding (EAC) With Implicit Auditory Masking", ACM Multimedia 2002, Dec. 1-6, 2002.

Henrique Malvar; "A Modulated Complex Lapped Transform and It's Applications to Audio Processing", Mar. 1999.

"SQAM—Sound Assessment Material", http:/www.tnt.uni-hannover.de/project/mpeg/audio/spam, Viewed Mar. 3, 2003.

* cited by examiner

PROGRESSIVE TO LOSSLESS EMBEDDED AUDIO CODER (PLEAC) WITH MULTIPLE FACTORIZATION REVERSIBLE TRANSFORM

TECHNICAL FIELD

The present invention relates generally to data coding, and more particularly to a system and method facilitating audio and/or picture encoding and/or decoding.

BACKGROUND OF THE INVENTION

The amount of information available via computers has dramatically increased with the wide spread proliferation of computer networks, the Internet and digital storage means. With such increased amount of information has come the need to transmit information quickly and to store the information efficiently. Data compression is a technology that facilitates the effective transmitting and storing of information Data compression reduces an amount of space necessary to represent information, and can be used for many information types. The demand for compression of digital information, including images, text, audio and video has been ever increasing. Typically, data compression is used with standard computer systems; however, other technologies make use of data compression, such as but not limited to digital and satellite television as well as cellular/digital phones.

As the demand for handling, transmitting and processing large amounts of information increases, the demand for compression of such data increases as well. Although storage device capacity has increased significantly, the demand for information has outpaced capacity advancements. For example, an uncompressed digital music source can require 5 megabytes of space whereas the same music can be compressed without loss and require only 2.5 megabytes of space. Thus, data compression facilitates transferring larger amounts of information. Even with the increase of transmission rates, such as broadband, DSL, cable modem Internet and the like, transmission limits are easily reached with uncompressed information. For example, transmission of an uncompressed music over a DSL line can take ten minutes. However, the same music can be transmitted in about one minute when compressed thus providing a ten-fold gain in data throughput.

In general, there are two types of compression, lossless and lossy. Lossless compression allows exact original data to be recovered after compression, while lossy compression allows for data recovered after compression to differ from the original data. A tradeoff exists between the two compression modes in that lossy compression provides for a better compression ratio than lossless compression because some degree of data integrity compromise is tolerated. Lossless compression may be used, for example, when compressing critical audio recording, because failure to reconstruct exactly the data can dramatically affect quality and analysis of the audio content. Lossy compression can be used with consumer music or non-critical audio recording where a certain amount of distortion or noise is tolerable to human senses.

Audio compression is an important technical problem. Most Web pages today host digital music, and digital music playing devices have become increasing popular these days.

Further, there are many existing schemes for encoding audio files. Several such schemes attempt to achieve higher compression rations by using known human psychoacoustic characteristics to mask the audio file. A psychoacoustic coder is an audio encoder which has been designed to take advantage of human auditory masking by dividing the audio spectrum of one or more audio channels into narrow frequency bands of different sizes optimized with respect to the frequency selectivity of human hearing. This makes it possible to sharply filter coding noise so that it is forced to stay very close in frequency to the frequency components of the audio signal being coded. By reducing the level of coding noise wherever there are no audio signals to mask it, the sound quality of the original signal can be subjectively preserved.

In fact, virtually all state-of-the-art audio coders, including the G.722.1 coder, the MPEG-1 Layer 3 coder, the MPEG-2 AAC coder, and the MPEG-4 T/F coder, recognize the importance of the psychoacoustic characteristics, and adopt auditory masking techniques in coding audio files. In particular, using human psychoacoustic hearing characteristics in audio file compression allows for fewer bits to be used to encode audio components that are less audible to the human ear. Conversely, more bits can then be used to encode any psychoacoustic components of the audio file to which the human ear is more sensitive. Such psychoacoustic coding makes it possible to greatly improve the quality of an encoded audio at given bit rate.

Psychoacoustic characteristics are typically incorporated into an audio coding scheme in the following way. First, the encoder explicitly computes auditory masking thresholds of a group of audio coefficients, usually a "critical band," to generate an "audio mask." These thresholds are then transmitted to the decoder in certain forms, such as, for example, the quantization step size of the coefficients. Next, the encoder quantizes the audio coefficients according to the auditory mask. For auditory sensitive coefficients, i.e., those to which the human ear is more sensitive, a smaller quantization step size is typically used. For auditory insensitive coefficients, i.e., those to which the human ear is less sensitive, a larger quantization step size is typically used. The quantized audio coefficients are then typically entropy encoded, either through a Huffman coder such as the MPEG-4 AAC quantization & coding, a vector quantizer such as the MPEG-4 TwinVQ, or a scalable bitplane coder such as the MPEG-4 BSAC coder.

In each of the aforementioned conventional audio coding schemes, the auditory masking is applied before the process of entropy coding. Consequently, the masking threshold is transmitted to the decoder as overhead information. As a result, the quality of the encoded audio at a given bit rate is reduced to the extent of the bits required to encode the auditory masking threshold information.

High performance audio codec brings digital music into reality. Popular audio compression technologies, such as MP3, MPEG-4 audio, Real™ and Windows Media Audio (WMA™), are usually lossy in nature. The audio waveform is distorted in exchange for higher compression ratio. In quality critical applications such as a recording/editing studio, it is imperative to maintain the best sound quality possible, i.e., the audio should be compressed in a lossless fashion. Since lossless compression ratio is usually limited, it is desirable that the lossless compressed bitstream be scaled to a lossy bitstream of high compression ratio. Most lossless audio coding approaches, simply build upon a lossy audio coder, and further encode the residue. The compression ratio of such approaches is often affected by the underlying lossy coder. Since the quantization noise in the lossy coder is difficult to model, the approaches usually lead to inefficiency in the lossless audio coding. Moreover, it is also more complex, as it requires a base coder and a residue coder. Some other approaches build the lossless audio coder directly through a predictive filter and then encode the prediction residue. The approaches may achieve good compression ratio, however, it is not compatible with existing lossy audio coding framework. Since the compression ratio of a lossless coder is rather limited, usually 2-3:1, the ability to scale a lossless bit stream is very useful. The bit stream generated by the predictive filter based lossless coder cannot be scaled. A lossy/residue coder can generate a bit stream with two layers, a lossy base layer and a lossless enhancement layer. However, the scaling cannot go beyond the lossy base layer. If further scaling in the lossless enhancement layer is required, it is necessary to match the design of the residue coder with that of the lossy coder, which causes significant complications. Some other approaches build the lossless audio coder directly through a predictive filter and then encode the prediction residue. Though achieving a good compression ratio, such approach is not compatible with existing lossy audio coding framework. Moreover, the resultant bitstream cannot be scaled.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention provides for a system and method for lossless and/or progressive to lossless data encoding. The system and method employ a multiple factorization reversible transform component that provides quantized coefficients that mimic a non-reversible linear transform as closely as possible.

In accordance with an aspect of the present invention, a lossless data coder system comprising a multiple factorization reversible transform component and an entropy encoder is provided. The system can losslessly encode data (e.g., image, picture and/or audio). The system receives a digital input (e.g., from an analog to digital converter) associated with, for example, an audio waveform. The system can be employed, for example, in a vast array of audio and/or document image applications, including, but not limited to, digital audio systems, segmented layered image systems, photocopiers, document scanners, optical character recognition systems, personal digital assistants, fax machines, digital cameras, digital video cameras and/or video games.

Conventionally, a reversible transform component(s) receive an integer input signal and provide an output of quantized coefficients corresponding to the input signal. It is said to be reversible because with such transform, it is possible to exactly recover the input signal from the quantized coefficient. With a reversible transform, lossless compression of the input signal becomes the lossless compression of the quantized coefficients, which are decorrelated and are easy to compress. Traditionally, a reversible transform is designed with a blueprint from a non-reversible linear transform, and by making substantially every component of the linear transform reversible. However, in such a design process, the quantization noise, which is the difference between the outcome of the reversible transform and its linear transform counterpart, can be large.

In accordance with an aspect of the present invention, in order to reduce quantization noise of the reversible transform, a multiple factorization reversible transform component is used which can factor a linear transform component with multiple reversible forms. In one example, a linear rotation operation is factorized into four different reversible operations. The core of all operations is a three step non-linear operation. However, the pair of input/output variables can be swapped before and after the certain non-linear operation. The sign of the input/output can be changed as well in certain other cases. The additional forms of factorization lead to different parameters for substantially the same rotation angle, and, thus allows the reversible transform to mimic that of a linear non-reversible transform (e.g., as closely as possible).

The multiple factorization reversible transform component can be employed in an N-point MLT in accordance with one aspect of the present invention. The MLT can comprise a modulation stage, a pre-FFT rotation stage, a complex FFT stage and a post-FFT rotation stage.

The modulation stage and pre-FFT rotation stage comprise multiple factorization rotation operation(s). The core of the complex FFT stage is a multiple factorization butterfly calculation, which is in turn implemented via multiple factorization rotation. The core of the post-FFT rotation stage is the conjugate rotation operation, which can be implemented by changing the sign of the imaginary part after a normal rotation.

The entropy encoder digitally entropy encodes the quantized coefficients and can employ any suitable entropy encoding technique(s).

Another aspect of the present invention provides for a progressive to lossless data coder system comprising a multiple factorization reversible transform component and an embedded entropy encoder. The progressive to lossless data coder system can be employed to code audio and/or images. The multiple factorization reversible transform component coupled with the embedded entropy encoder (e.g., a high performance embedded entropy codec) empowers the system with both lossless capability and fine granular scalability progressiveness. The system generates a bit stream that if fully decoded, substantially recovers the original waveform (e.g., audio) without loss and facilitates lossless compression. If a higher compression ratio is desired, the application may extract a subset of the compressed bit stream and form a higher compression ratio bit stream of lossy nature. Such scaling can be performed in a very large bit rate range, with granularity down to a single byte. With the progressive to lossless functionality of the system, the application can easily balance between the amount of compression required and the desired quality, from a fairly high compression ratio all the way to lossless (e.g., based on available bandwidth and/or user preference).

The embedded entropy encoder can employ any suitable embedded entropy encoding technique(s). In one example, the embedded entropy encoder employs a fully scalable psychoacoustic audio coder that derives auditory masking thresholds from previously coded coefficients, and uses the derived thresholds for optimizing the order of coding.

Yet another aspect of the present invention provides for a progressive to lossless audio coder system comprising a reversible multiplexer, multiple factorization reversible transform component(s), embedded entropy encoder(s) and a bit stream assembler. The system receives an input audio waveform which first goes through the reversible multiplexer. If the input audio is stereo, it is separated into L+R and L−R components. The waveform of each audio component is then transformed by the multiple factorization reversible transform component(s) (e.g., a multiple factorization reversible modulated lapped transform).

The reversible multiplexer receives, for example, a stereo audio input. The reversible multiplexer separates the stereo audio input into L+R and L−R components, where L and R represent the waveform on the left and right audio channel, respectively. If the input audio is mono, the reversible multiplexer passes through the audio. Each component is then encoded separately.

The bit stream assembler receives the embedded bit stream of the L+R and L−R channels from the embedded entropy encoders and forms the final bit stream of the system. The bit stream assembler thus allocates the available coding bit rate among multiple timeslots and channels, truncates the embedded bit stream of each timeslot and channel according to the allocated bit rate, and produces a final compressed bit stream.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
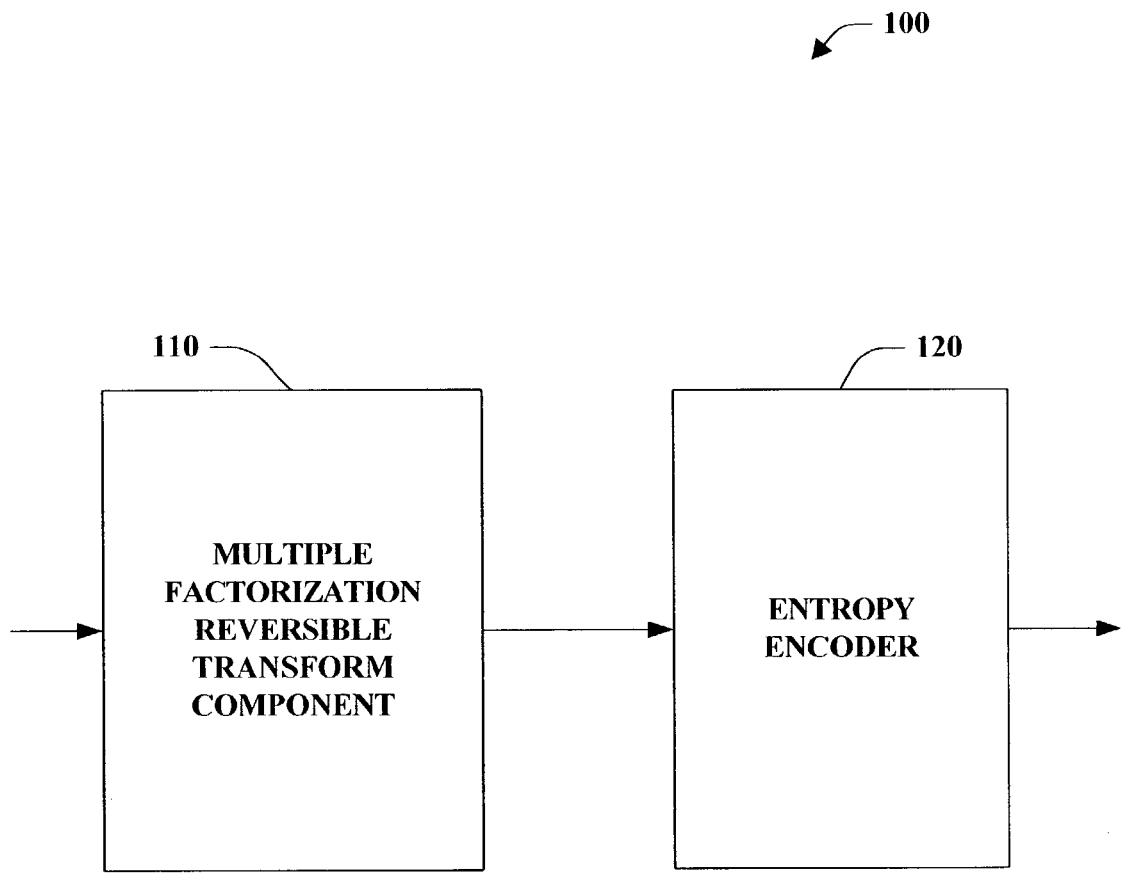
FIG. 1 is a block diagram of a lossless data coder system in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the term "computer component" is intended to refer to a computer-related entity, either hardware, a combination of hardware and software, software, or software in execution. For example, a computer component may be, but is not limited to being, a process running on a processor, a processor, an object, an executable, a thread of execution, a program, and/or a computer. By way of illustration, both an application running on a server and the server can be a computer component. One or more computer components may reside within a process and/or thread of execution and a component may be localized on one computer and/or distributed between two or more computers.

Referring to FIG. 1, a lossless data coder system 100 in accordance with an aspect of the present invention is illustrated. The system comprises a multiple factorization reversible transform component 110 and an entropy encoder 120.

The system 100 can losslessly encode data (e.g., image, picture and/or audio). The system 100 receives a digital input (e.g., from an analog to digital converter) associated with, for example, an audio waveform. The system 100 can be employed, for example, in a vast array of audio and/or document image applications, including, but not limited to, digital audio systems, segmented layered image systems, photocopiers, document scanners, optical character recognition systems, personal digital assistants, fax machines, digital cameras, digital video cameras and/or video games.

The multiple factorization reversible transform component 110 receives an input signal and provides an output of quantized coefficients corresponding to the input signal. The multiple factorization reversible transform component 110 can employ, for example, a reversible modulated lapped transform, a reversible DCT, a reversible DST and/or a reversible FFT.

For example, the output of quantized coefficients can be based, at least in part, upon a reversible modulated lapped transform (MLT). The lossless compression efficiency is affected by the similarity between the reversible MLT and its non-reversible counter part. Therefore, the reversible MLT is designed so that its transform result mimics the result of a non-reversible MLT (e.g., as much as possible). In conventional system(s), the reversible MLT is built with reference to a linear non-reversible MLT, and by making substantially every component of the non-reversible MLT reversible.

The rotation operation is a key element of a non-reversible MLT, as well as other non-reversible transforms commonly used in compression, such as DCT, DST and/or FFT. To build the reversible MLT, a reversible rotation is built:

$$\begin{bmatrix} x' \\ y' \end{bmatrix} = \begin{bmatrix} \cos\theta & -\sin\theta \\ \sin\theta & \cos\theta \end{bmatrix} \begin{bmatrix} x \\ y \end{bmatrix} \quad (1)$$

The matrix $$\begin{bmatrix} \cos\theta & -\sin\theta \\ \sin\theta & \cos\theta \end{bmatrix}$$

is used to denote a reversible rotation operation. A reversible rotation typically has the following properties:

a. For integer input $$\begin{bmatrix} x \\ y \end{bmatrix},$$

the outcome $$\begin{bmatrix} x' \\ y' \end{bmatrix}$$

of the reversible rotation should be quantized coefficients, i.e., integer value as well.

b. With proper inverse operation, it is possible to exactly recover $$\begin{bmatrix} x \\ y \end{bmatrix}$$

from $$\begin{bmatrix} x' \\ y' \end{bmatrix}.$$

c. The outcome $$\begin{bmatrix} x' \\ y' \end{bmatrix}$$

should bear close resemblance to that of a linear rotation. The difference between the integer outcome $$\begin{bmatrix} x' \\ y' \end{bmatrix}$$

and the linear rotation result is defined as the quantization error.

Traditionally, a rotation can be factored into a three step non-linear operations:

$$\begin{cases} \text{step 0: } z = x + \lfloor c_0 y \rfloor \\ \text{step 1: } x' = y + \lfloor c_1 z \rfloor \\ \text{step 2: } y' = z + \lfloor c_0 x' \rfloor \end{cases} \quad (2)$$

where $c_o = (\cos\theta - 1)/\sin\theta$ and $c_1 = \sin\theta$ are parameters of the operation; $\lfloor \cdot \rfloor$ denotes an integerize operation, where the floating operand is converted to an integer number. The rotation clearly is reversible, such that the intermediate integer variable z can be recovered (e.g., exactly) from x' and y' with step 2, and then recover the integer input y from x' and z with step 1, and finally recover integer input x from x and z with step 0. Again for notation simplicity, the upper triangle matrix $$\begin{bmatrix} x' \\ y' \end{bmatrix} = \begin{bmatrix} 1 & c_0 \\ 0 & 1 \end{bmatrix} \begin{bmatrix} x \\ y \end{bmatrix}$$

is used to denote non-linear operation $x' = x + \lfloor c_0 y \rfloor$, and the bottom triangle matrix $$\begin{bmatrix} x' \\ y' \end{bmatrix} = \begin{bmatrix} 1 & 0 \\ c_1 & 1 \end{bmatrix} \begin{bmatrix} x \\ y \end{bmatrix}$$

to denote non-linear operation $y' = y + \lfloor c_1 x \rfloor$. The reversible rotation factorization of (2) can thus be denoted as:

$$\begin{bmatrix} \cos\theta & -\sin\theta \\ \sin\theta & \cos\theta \end{bmatrix} = \begin{bmatrix} 1 & \frac{\cos\theta - 1}{\sin\theta} \\ 0 & 1 \end{bmatrix} \cdot \begin{bmatrix} 1 & 0 \\ \sin\theta & 1 \end{bmatrix} \cdot \begin{bmatrix} 1 & \frac{\cos\theta - 1}{\sin\theta} \\ 0 & 1 \end{bmatrix} \quad (3)$$

It is to be appreciated that a reversible transform employing the factorization set forth in equation (2) as the basic reversible rotation operation satisfies for the reversible transform yields a reversible transform with compact data representation. However, with certain rotation angle θ, the quantization noise can be fairly large, and can lead to poor signal representation.

Significantly, in accordance with an aspect of the present invention, instead of factoring a linear transform, e.g., a linear rotation into a single reversible factorization form, e.g., in (3), multiple forms of factorization are used. In one example, a proper form of reversible factorization is selected based on one or more transform parameter(s). With multiple factorization, it is possible to achieve much smaller quantization noise, and thus enables the reversible transform to mimic its linear transform counter part as closely as possible. This approach is referred to herein as "multiple factorization reversible transform".

For example, a reversible rotation can be factorized with three additional forms:

$$\begin{bmatrix} \cos\theta & -\sin\theta \\ \sin\theta & \cos\theta \end{bmatrix} = \begin{bmatrix} 0 & 1 \\ -1 & 0 \end{bmatrix} \quad (4)$$

$$\begin{bmatrix} 1 & \frac{-\sin\theta - 1}{\cos\theta} \\ 0 & 1 \end{bmatrix} \cdot \begin{bmatrix} 1 & 0 \\ \cos\theta & 1 \end{bmatrix} \cdot \begin{bmatrix} 1 & \frac{-\sin\theta - 1}{\cos\theta} \\ 0 & 1 \end{bmatrix}$$

$$\begin{bmatrix} \cos\theta & -\sin\theta \\ \sin\theta & \cos\theta \end{bmatrix} = \begin{bmatrix} -1 & 0 \\ 0 & 1 \end{bmatrix} \begin{bmatrix} 1 & \frac{\sin\theta - 1}{\cos\theta} \\ 0 & 1 \end{bmatrix} \cdot \begin{bmatrix} 1 & 0 \\ \cos\theta & 1 \end{bmatrix}. \quad (5)$$

$$\begin{bmatrix} 1 & \frac{\sin\theta - 1}{\cos\theta} \\ 0 & 1 \end{bmatrix} \begin{bmatrix} 0 & 1 \\ 1 & 0 \end{bmatrix}$$

$$\begin{bmatrix} \cos\theta & -\sin\theta \\ \sin\theta & \cos\theta \end{bmatrix} = \begin{bmatrix} -1 & 0 \\ 0 & 1 \end{bmatrix} \begin{bmatrix} 1 & \frac{-\cos\theta - 1}{\sin\theta} \\ 0 & 1 \end{bmatrix} \cdot \begin{bmatrix} 1 & 0 \\ \sin\theta & 1 \end{bmatrix}. \quad (6)$$

$$\begin{bmatrix} 1 & \frac{-\cos\theta - 1}{\sin\theta} \\ 0 & 1 \end{bmatrix} \begin{bmatrix} 1 & 0 \\ 0 & -1 \end{bmatrix}$$

The core of the factorization is still the three step non-linear operation set forth in equation (3). However, the pair of input/output variables can be swapped before (as in equation (5)) and after (as in equation (4)) the non-linear operation. The sign of the input/output can be changed as well in certain cases. The additional forms of factorization lead to different non-linear parameters $c_0$ and $c_1$ for substantially the same rotation angle θ, and, thus allows the reversible transform to mimic that of a linear non-reversible transform (e.g., as closely as possible).

Let Δx' and Δy' represent quantization noise. Quantization noise is the difference between the outcome of a reversible transform and that of a linear non-reversible transform. In accordance with an aspect of the present invention, a reversible transform that minimizes the average energy of the quantization noise $E[\Delta x'^2] + E[\Delta y'^2]$ is desired. The integerize operation introduces the quantization noise into the reversible transform (e.g., based upon truncation and/or rounding). The coefficient swapping and sign changing operations in equations (4)-(6) do not introduce additional quantization noise. Let Δ represent the quantization noise of a single integerize operation:

$$\lfloor x \rfloor = x + \Delta \quad (7)$$

The quantization noise in the reversible transform can be modeled as:

$$\begin{bmatrix} \Delta x' \\ \Delta y' \end{bmatrix} = \begin{bmatrix} c_1 \Delta_0 + \Delta_1 \\ (c_0 c_1 + 1)\Delta_0 + c_0 \Delta_1 + \Delta_2 \end{bmatrix} \quad (8)$$

where $\Delta_0 - \Delta_2$ are the quantization noise at non-linear steps 0-2. Let the quantization noise at each step be independent and identically distributed random variables, with $E[\Delta^2]$ representing the average energy of the quantization noise of a single integerize operation. The average energy of the quantization noise can be calculated as:

$$E[\Delta x'^2] + E[\Delta y'^2] = \{(1+c_0 c_1)^2 + c_0^2 + c_1^2 + 2\} E[\Delta^2] \quad (9)$$

Figure 2:
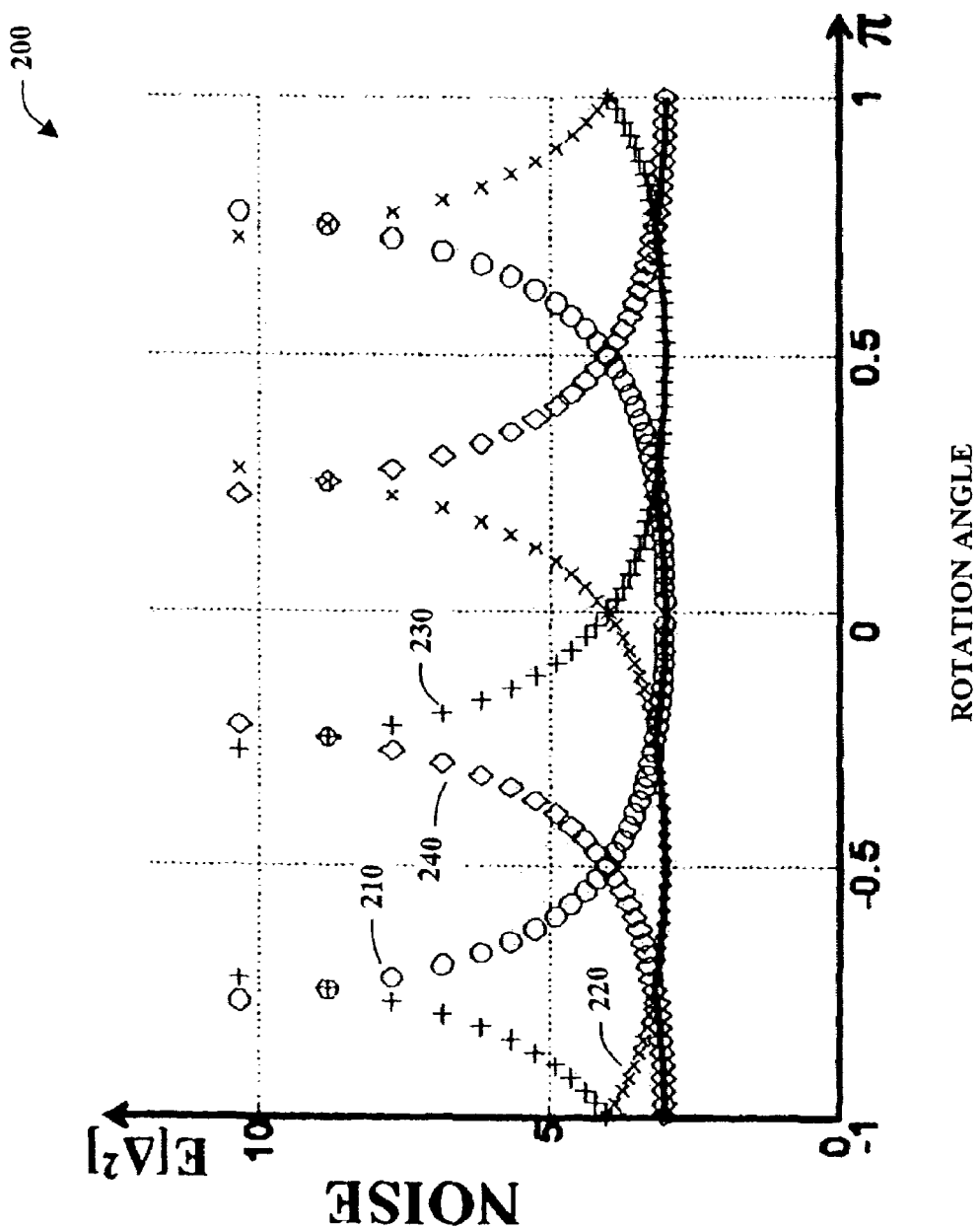
FIG. 2 is a graph illustrating the quantization noise versus rotation angles for different factorization forms in accordance with an aspect of the present invention.

A graph 200 illustrating the quantization noise versus rotation angles for different factorization forms as set forth in equations (3)-(6) in accordance with an aspect of the present invention is illustrated in FIG. 2. A line 210 denoted by "o" corresponds to equation (3). A line 220 denoted by "x" corresponds to equation (4). A line 230 denoted by "+" corresponds to equation (5). A line 240 denoted by "◊" corresponds to equation (6).

It can be observed that with any single factorization, the quantization noise can be large at certain rotation angle. By switching among different factorizations, more specifically, by using factorization forms (3), (4), (5) and (6) for rotation angles (−0.25π, 0.25π), (−0.75π,−0.25π), (0.25π, 0.75π) and (0.75π, 1.25π), respectively, the quantization noise can be controlled to be at most 3.2 $E[\Delta^2]$. In one example, a subset of the factorization forms (3)-(6) are used, for example, for reduced complexity, albeit at a slightly large quantization noise. For example, factorization form (3) can be used for rotation angle (−0.5 π, 0.5 π), and form (6) for rotation angle (0.5 π, 1.5 π). In such a case, the quantization noise is capped at 4 $E[\Delta^2]$.

To achieve reduced quantization noise, in one example, rounding towards the nearest integer can be employed as the integerize operation. In another example, truncation can be employed as the integerize operation. However, rounding toward the nearest integer can lead to significantly smaller quantization noise and better lossless compression performance, as it has a smaller single step quantization noise $E[\Delta^2]$.

A common operation in the reversible operation is a multiplication+integerize operation in the non-linear operation, which is in the form of $\lfloor c_f y \rfloor$. In C/C++ implementation of reversible transform, the operation is generally implemented as:

floor(1dexp($c_f$, 2*SHIFT_INT)*y+0.5);

where y is usually a 32 bit integer, $c_f$ is a floating number represented by a 32 bit integer c, the number $c_f$ is related to the 32 bit integer c through $c_f = c * 2^{(-SHIFT\_INT)}$, where SHIFT_TNT is a system constant, which is 24 in one example. This can be the most computational intensive operation of the entire reversible transform. On an x86 system, this can be implemented as inline assembly as:

```
_asm
{
    MOV    eax, y;
    IMUL   c;                    // edx:eax = x*y;
    SHL    edx, SHIFT_REST;
    SHR    eax, SHIFT_INT;
    ADC    eax, edx;
};
``` where SHIFT_REST=32-SHIFT_INT. Such operation alone can speed up the implementation, for example, by a factor of 10.

In one example, the multiple factorization reversible transform component 110 can employ a reversible MLT that can be factored into a window modulation and a type IV Discrete Cosine Transform (DCT); the latter of which can be further factored into a pre-Fast Fourier Transform (FFT) rotation, a complex FFT, and a post-FFT rotation operation; each of which can be further built upon multiple factorized reversible rotation.

Figure 3:
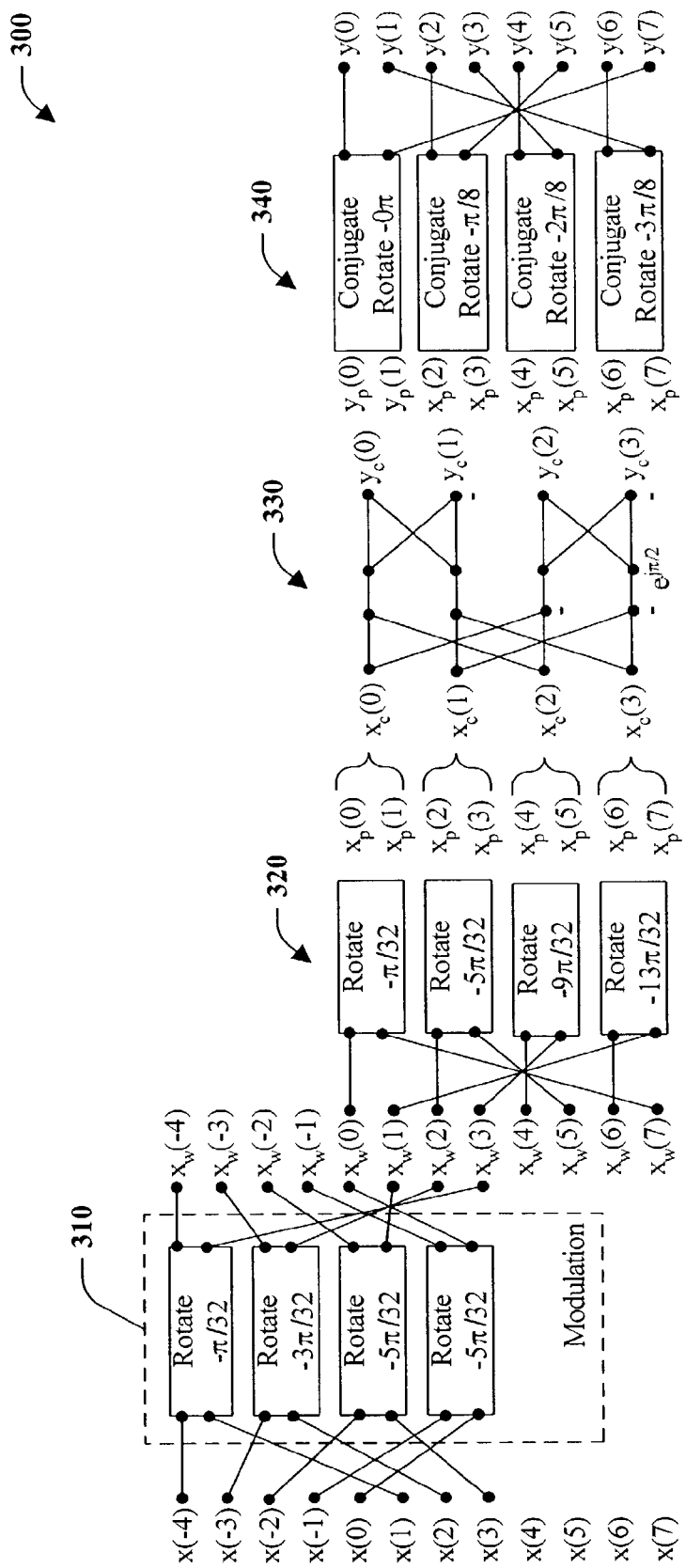
FIG. 3 is a block diagram of a multiple factorization reversible transform component employing an 8-point MLT in accordance with an aspect of the present invention.

Referring to FIG. 3, a multiple factorization reversible transform component 300 employing an 8-point MLT in accordance with an aspect of the present invention is illustrated. The MLT 300 comprises a modulation stage 310, a pre-FFT rotation stage 320, a complex FFT stage 330 and a post-FFT rotation stage 340. The multiple factorization reversible transform component 300 is one example of a multiple factorization reversible transform component that can be employed by the multiple factorization reversible transform component 110.

The modulation stage 310 and pre-FFT rotation stage 320 comprise rotation operation as set forth in equation (1) that can be reversibly implemented. The core of the complex FFT stage 330 is the butterfly calculation:

$$\begin{bmatrix} y_c(i) \\ y_c(j) \end{bmatrix} = \begin{bmatrix} 1 & 0 \\ 0 & e^{-j\pi\omega} \end{bmatrix} \begin{bmatrix} 1 & 1 \\ 1 & -1 \end{bmatrix} \cdot \begin{bmatrix} x_c(i) \\ x_c(j) \end{bmatrix}, \quad (10)$$

where $x_c(i)$ and $y_c(i)$ are complex numbers. The first matrix is a complex rotation that can be reversibly implemented. The second matrix is a complex multiplexer. In this example, a $0.25\pi$ rotation for both the real and imaginary part of $x_c(i)$ and $x_c(j)$ is implemented. With $0.257\pi$ rotation, there is a gain factor of $1/\sqrt{2}$, thus, the implemented reversible butterfly is:

$$\begin{bmatrix} y_c(i) \\ y_c(j) \end{bmatrix} = \begin{bmatrix} 1 & 0 \\ 0 & e^{-j\pi\omega} \end{bmatrix} \begin{bmatrix} 1/\sqrt{2} & -1\sqrt{2} \\ 1/\sqrt{2} & 1/\sqrt{2} \end{bmatrix} \cdot \begin{bmatrix} x_c(i) \\ x_c(j) \end{bmatrix}. \quad (11)$$

In contrast to the butterfly of equation (10) that has an absolute determinant of 2, the absolute determinant of the butterfly of equation (11) is 1, which does not expand the data and is thus more suitable for lossless compression purpose. In the butterfly (equation (11)), the output coefficient $y_c(i)$ and $y_c(j)$ are equally weighted, so that it can be cascaded in the FFT operation.

The core of the post-FFT rotation stage 340 is the conjugate rotation operation, which can be implemented by changing the sign of the imaginary part after a normal rotation:

$$\begin{bmatrix} x' \\ y' \end{bmatrix} = \begin{bmatrix} \cos\theta & -\sin\theta \\ -\sin\theta & -\cos\theta \end{bmatrix} \begin{bmatrix} x \\ y \end{bmatrix} = \begin{bmatrix} 1 & 0 \\ 0 & -1 \end{bmatrix} \begin{bmatrix} \cos\theta & -\sin\theta \\ \sin\theta & \cos\theta \end{bmatrix} \begin{bmatrix} x \\ y \end{bmatrix}, \quad (12)$$

It is to be appreciated that the transform of equation (12) can be reversibly implemented.

The reversible rotation has a determinant of 1, and the operations of swapping coefficients and changing sign have a determinant of −1. The absolute determinant of the entire reversible MLT is thus 1. Because a determinant 1 transform preserves the signal energy, the quantization noise of the reversible MLT is roughly proportional to the number of rotations in the transform, which is $O(N\log_2 N)E[\Delta^2]$ for an N-point MLT (note that there are two rotations per butterfly in the complex FFT). Such implementation is more favorable than factoring the reversible MLT (or type IV DCT) through an N-point LU transform, where the quantization noise that is caused by a long chain of non-linear operation can be much larger.

Referring back to FIG. 1, the entropy encoder 120 digitally entropy encodes the quantized coefficients. The entropy encoder 120 can employ any suitable entropy encoding technique(s). Accordingly, any suitable entropy encoding technique for employment in connection with the present invention is intended to fall within the scope of the appended claims.

While FIG. 1 is a block diagram illustrating components for the lossless data coder system 100 that uses a multiple factorization reversible transform components. It is to be appreciated that the lossless data coder system 100, the multiple factorization reversible transform component 110 and/or the entropy encoder 120 can be implemented as one or more computer components, as that term is defined herein. Thus, it is to be appreciated that computer executable components operable to implement the lossless data coder system 100, the multiple factorization reversible transform component 110 and/or the entropy encoder 120 can be stored on computer readable media including, but not limited to, an ASIC (application specific integrated circuit), CD (compact disc), DVD (digital video disk), ROM (read only memory), floppy disk, hard disk, EEPROM (electrically erasable programmable read only memory) and memory stick in accordance with the present invention.

Figure 4:
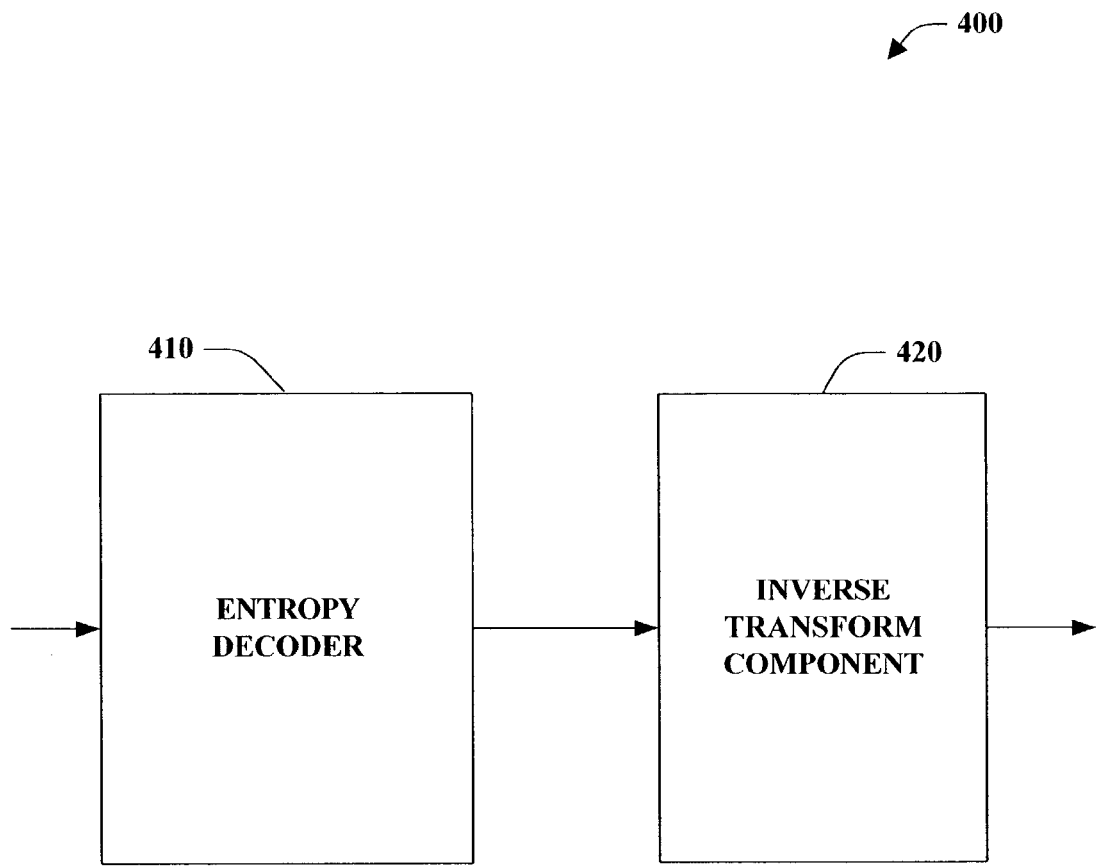
FIG. 4 is a block diagram of a lossless data decoder system in accordance with an aspect of the present invention.

Next, referring to FIG. 4, a lossless data decoder system 400 in accordance with an aspect of the present invention is illustrated. The system 400 comprises an entropy decoder 410 and an inverse transform component 420.

The entropy decoder 410 receives a bit stream (e.g., produced by a corresponding entropy encoder) and decodes the bit stream. Thus, the entropy decoder 410 digitally entropy decodes the input bit stream and provides the decoded information to the inverse transform component 420.

The inverse transform component 420 receives output values from the entropy decoder 410. The inverse transform component 420 transforms the output values from the entropy decoder 410 and provides output values. In one example, the inverse transform component 420 utilizes an inverse reversible MLT, to essentially revert the computations in the multiple factorization reversible transform component 110.

It is to be appreciated that the lossless data decoder system 400, the entropy decoder 410 and/or the inverse transform component 420 can be computer components as that term is defined herein.

Figure 5:
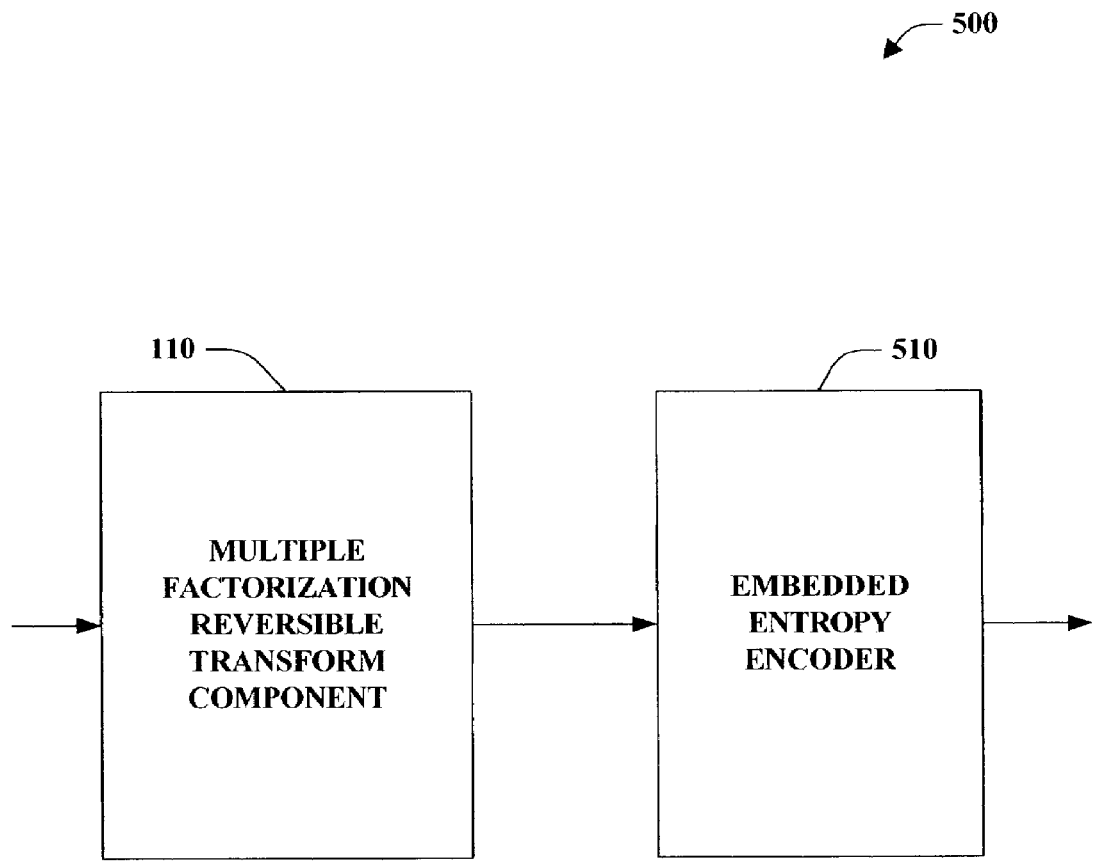
FIG. 5 is a block diagram of a progressive to lossless data coder system in accordance with an aspect of the present invention.

Turning to FIG. 5, a progressive to lossless data coder system 500 in accordance with an aspect of the present invention is illustrated. The system 500 comprises a multiple factorization reversible transform component 110 and an embedded entropy encoder 510.

The progressive to lossless data coder system 500 can be employed to code audio and/or images. In one example, the system 500 is based on reversible transform that is designed to mimic the non-reversible transform in a normal psychoacoustic audio coder (e.g., as much as possible). The multiple factorization reversible transform component 110 coupled with the embedded entropy encoder 510 (e.g., a high performance embedded entropy codec) empowers the system 500 with both lossless capability and fine granular scalability progressiveness. The system 500 generates a bit stream that if fully decoded, substantially recovers the original audio waveform without loss and facilitates lossless compression. If a higher compression ratio is desired, the application may extract a subset of the compressed bit stream and form a higher compression ratio bit stream of lossy nature. Such scaling can be performed in a very large bit rate range, with granularity down to a single byte. With the progressive to lossless functionality of the system 500, the application can easily balance between the amount of compression required and the desired audio quality, from a fairly high compression ratio all the way to lossless (e.g., based on available bandwidth and/or user preference).

The embedded entropy encoder 510 can employ any suitable embedded entropy encoding technique(s). Accordingly, any suitable embedded entropy encoding technique for employment in connection with the present invention is intended to fall within the scope of the appended claims.

In one example, the embedded entropy encoder 510 employs a fully scalable psychoacoustic audio coder that derives auditory masking thresholds from previously coded coefficients, and uses the derived thresholds for optimizing the order of coding. The basic theory behind acoustic or auditory masking is described in general terms herein.

In general, the basic theory behind auditory masking is that humans do not have the ability to hear minute differences in frequency. For example, it is very difficult to discern the difference between a 1,000 Hz signal and a signal that is 1,001 Hz. It becomes even more difficult for a human to differentiate such signals if the two signals are playing at the same time. Further, studies have shown the 1,000 Hz signal would also affect a human's ability to hear a signal that is 1,010 Hz, or 1,100 Hz, or 990 Hz. This concept is known as masking. If the 1,000 Hz signal is strong, it will mask signals at nearby frequencies, making them inaudible to the listener. In addition, there are two other types of acoustic masking which affects human auditory perception. In particular, as discussed below, both temporal masking and noise masking also effect human audio perception. These ideas are used to improve audio compression because any frequency components in the audio file which fall below a masking threshold can be discarded, as they will not be perceived by a human listener.

In this example, the embedded entropy encoder 510 is a fully scalable generic audio coder that uses implicit auditory masking that is intermixed with a scalable entropy coding process. Further, auditory masking thresholds are not sent to the decoder, instead, they are derived from the already coded coefficients. Furthermore, rather than quantizing the audio coefficients according to the auditory masking thresholds, the masking thresholds are used to control the order that the coefficients are encoded. In particular, during the scalable coding, larger audio coefficients are encoded first, as the larger components are the coefficients that contribute most to the audio energy level and lead to a higher auditory masking threshold.

For example, the MLT transform coefficients received from the multiple factorization reversible transform component 110 are split into a number of sections. This section split operation enables the scalability of the audio sampling rate. Such scalability is particularly useful where different frequency responses of the decoded audio file are desired. For example, where one or more playback speakers associated with the decoder do not have a high frequency response, or where it is necessary for the decoder to save either or both computation power and time, one or more sections corresponding to particular high frequency components of the MLT transform coefficients can be discarded.

Each section of the MLT transform coefficients is then entropy encoded into an embedded bit stream, which can be truncated and reassembled at a later stage. Further, to improve the efficiency of the entropy coder, the MLT coefficients are grouped into a number of consecutive windows termed a timeslot. In a one example, a timeslot consists of 16 long MLT windows or 128 short MLT windows. However, it should be clear to those skilled in the art that the number of windows can easily be changed.

In particular, first, the auditory masking is used to determine the order that the transform coefficients are encoded, rather than to change the transform coefficients by quantizing them. Instead of coding any auditory insensitive coefficients coarsely, in this example, the embedded entropy coder 510 encodes such coefficients in a later stage. By using the auditory masking to govern the coding order, rather than the coding content, the embedded entropy coder 510 achieves embedded coding up to and including lossless encoding of the audio input, as all content is eventually encoded. Further, the quality of the audio becomes less sensitive to the auditory masking, as slight inaccuracies in the auditory masking simply cause certain audio coefficients to be encoded later.

Second, in this example, the auditory masking threshold is derived from the already encoded coefficients, and gradually refined with the embedded coder (e.g., "implicit auditory masking"). In implementing the implicit audio masking, the most important portion of the transform coefficients (e.g., the top bitplanes), are encoded first. A preliminary auditory masking threshold is calculated based on the already coded transform coefficients. Since the decoder automatically derives the same auditory masking threshold from the coded transform coefficients, the value of the auditory masking threshold does not need to be sent to the decoder. Further, the calculated auditory masking threshold is used to govern which part of the transform coefficients is to be refined.

After the next part of the transform coefficients has been encoded, a new set of auditory masking threshold is calculated. This process repeats until a desired end criterion has been met, e.g., all transform coefficients have been encoded, a desired coding bit rate has been reached, or a desired coding quality has been reached. By deriving the auditory masking threshold from the already coded coefficients, bits normally required to encode the auditory masking threshold are saved. Consequently, the coding quality is improved, especially when the coding bit rate is low.

In another example, the embedded entropy encoder 510 employs a traditional coder which carries the auditory masking threshold as a head of the bit stream.

Thus, after the reversible transform is performed by the multiple factorization reversible transform component 110, the MLT coefficients of multiple windows are grouped into a timeslot. The coefficients of each timeslot are then entropy encoded by the embedded entropy encoder 510 which not only efficiently compresses the coefficients, but also renders the output bit stream with the embedding (e.g., progressive) property, so that the bit stream (e.g., of each channel) can be truncated at any point.

It is to be appreciated that the system 500 and/or the embedded entropy encoder 510 can be computer components as that term is defined herein.

Figure 6:
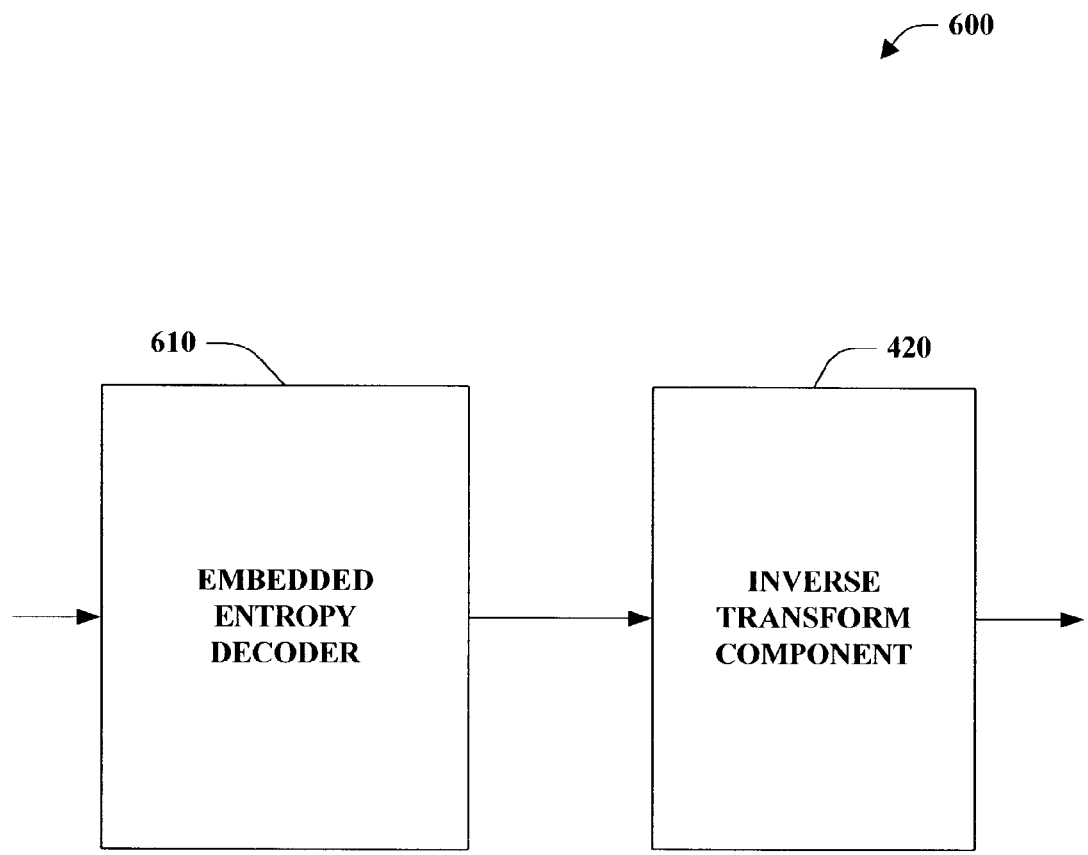
FIG. 6 is a block diagram of a progressive to lossless data decoder system in accordance with an aspect of the present invention.

Referring to FIG. 6, a progressive to lossless data decoder system 600 in accordance with an aspect of the present invention is illustrated. The system comprises an embedded entropy decoder 610 and an inverse transform component 420.

The embedded entropy decoder 610 receives a bit stream (e.g., produced by a corresponding entropy encoder) and decodes the bit stream. Thus, the embedded entropy decoder 610 digitally entropy decodes the input bit stream and provides the decoded information to the inverse transform component 420.

The inverse transform component 420 receives output values from the embedded entropy decoder 610. The inverse transform component 420 transforms the output values from the embedded entropy decoder 610 and provides output values. In one example, the inverse transform component 420 utilizes an inverse reversible MLT, to essentially revert the computations in the multiple factorization reversible transform component 110.

It is to be appreciated that the progressive to lossless data decoder system 600 and/or the embedded entropy decoder 610 can be computer components as that term is defined herein.

Figure 7:
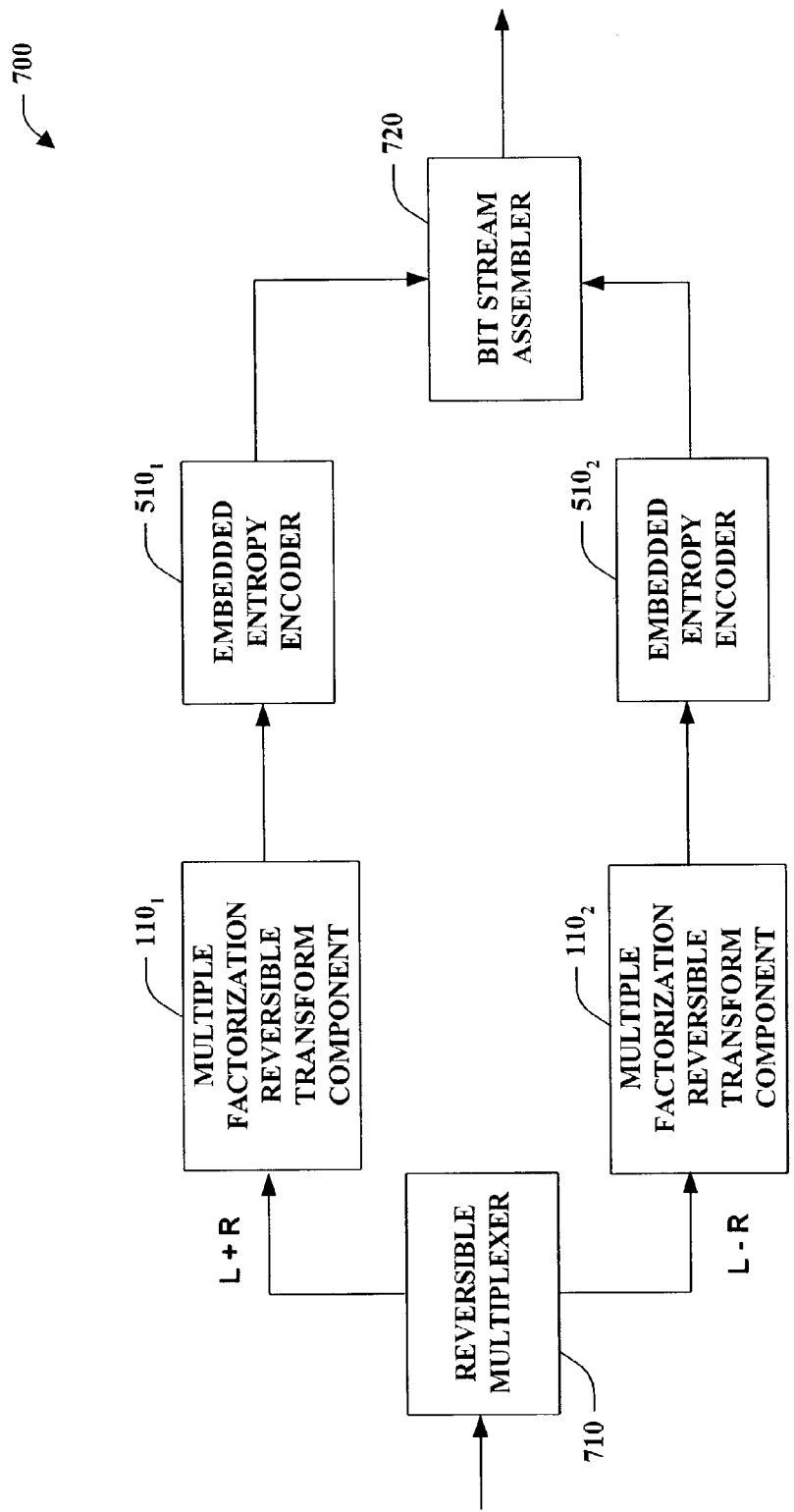
FIG. 7 is a block diagram of a progressive to lossless stereo audio coder system in accordance with an aspect of the present invention.

Next, turning to FIG. 7, a progressive to lossless stereo audio coder system 700 in accordance with an aspect of the present invention is illustrated. The system 700 comprises a reversible multiplexer 710, multiple factorization reversible transform components 110$_1$, 110$_2$, embedded entropy encoders 510$_1$, 510$_2$ and a bit stream assembler 720.

The system 700 receives an input audio waveform which first goes through the reversible multiplexer 710. If the input audio is stereo, it is separated into L+R and L−R components. The waveform of each audio component is then transformed by the multiple factorization reversible transform components $110_1$, $110_2$ (e.g., with switching windows). In one example, the window size can be either 2048 or 256 samples. After the multiple factorization reversible transform components $110_1$, $110_2$, the MLT coefficients of a number of consecutive windows are grouped into a timeslot.

For example, a timeslot can consist of 16 long MLT windows or 128 short windows. A timeslot therefore consists of 32,768 samples, which is about 0.74 second if the input audio is sampled at 44.1 kHz. The coefficients in the timeslot are then entropy encoded by the embedded entropy encoders $510_1$, $510_2$ whose output bit stream can be truncated at any point later.

The reversible multiplexer 710 receives, for example, a stereo audio input. The reversible multiplexer 710 separates the stereo audio input into L+R and L−R components using conventional techniques, where L and R represent the waveform on the left and right audio channel, respectively. If the input audio is mono, the reversible multiplexer passes through the audio. Each component is then encoded separately.

Let x and y be the left and right channel, x' and y' be the multiplexed channel L+R and L−R, a reversible multiplexer can be implemented in non-linear form as:

$$\begin{bmatrix} x' \\ y' \end{bmatrix} = \begin{bmatrix} 1 & -1/2 \\ 0 & 1 \end{bmatrix} \begin{bmatrix} 1 & 0 \\ 1 & -1 \end{bmatrix} \begin{bmatrix} x \\ y \end{bmatrix} \quad (13)$$

or alternatively, be written as:

$$\begin{cases} \text{step 0:} & y' = x - y \\ \text{step 1:} & x' = x - \lfloor y'/2 \rfloor \end{cases} \quad (14)$$

where $\lfloor x \rfloor$ again denotes an integerize operation. Equation (13) produces integer input from integer output and can be exactly reversed. Ignoring the nonlinearity in the integerize operation, the relationship between the input/output pair can be formulated through a linear transform as:

$$\begin{bmatrix} x' \\ y' \end{bmatrix} = \begin{bmatrix} 1/2 & 1/2 \\ 1 & -1 \end{bmatrix} \begin{bmatrix} x \\ y \end{bmatrix} \quad (15)$$

The determinant of the transform of equation (15) is −1, which means the volume of the input/output space is equal.

There are alternative implementations of the reversible multiplexer, e.g., with a rotation by $0.25\pi$ operation, or via:

$$\begin{cases} \text{step 0:} & y' = x - y \\ \text{step 1:} & x' = x + y \end{cases} \quad (16)$$

However, the reversible multiplexer in the form of equation (16) has an absolute determinant of 2, which expands the data and is less efficient for lossless compression. The reversible multiplexer using $0.251\pi$ rotation operation needs 3 integerize operations and has a quantization noise of $3.2\ E[\Delta^2]$, the reversible multiplexer of equation (13) has only one integerize operation, with a quantization noise of $E[\Delta^2]$. It is thus a more favorable implementation. With the reversible multiplexer of equation (13), the L−R and L+R channels are not equally weighted, the L−R channels carries a weight which is 4 times heavier than that of the L+R channels. The non-equal weight is not problematic in lossless coding, as all quantized coefficients of the L−R and L+R channels are simply encoded. In case the lossless bit stream is truncated, it can compensate the non-equal weighting by encoding the L+R channels with one more bitplane.

The bit stream assembler 720 receives the embedded bit stream of the L+R and L−R channels from the embedded entropy encoders $510_1$, $510_2$. The bit stream assembler forms the final bit stream of the system 700.

Figure 8:
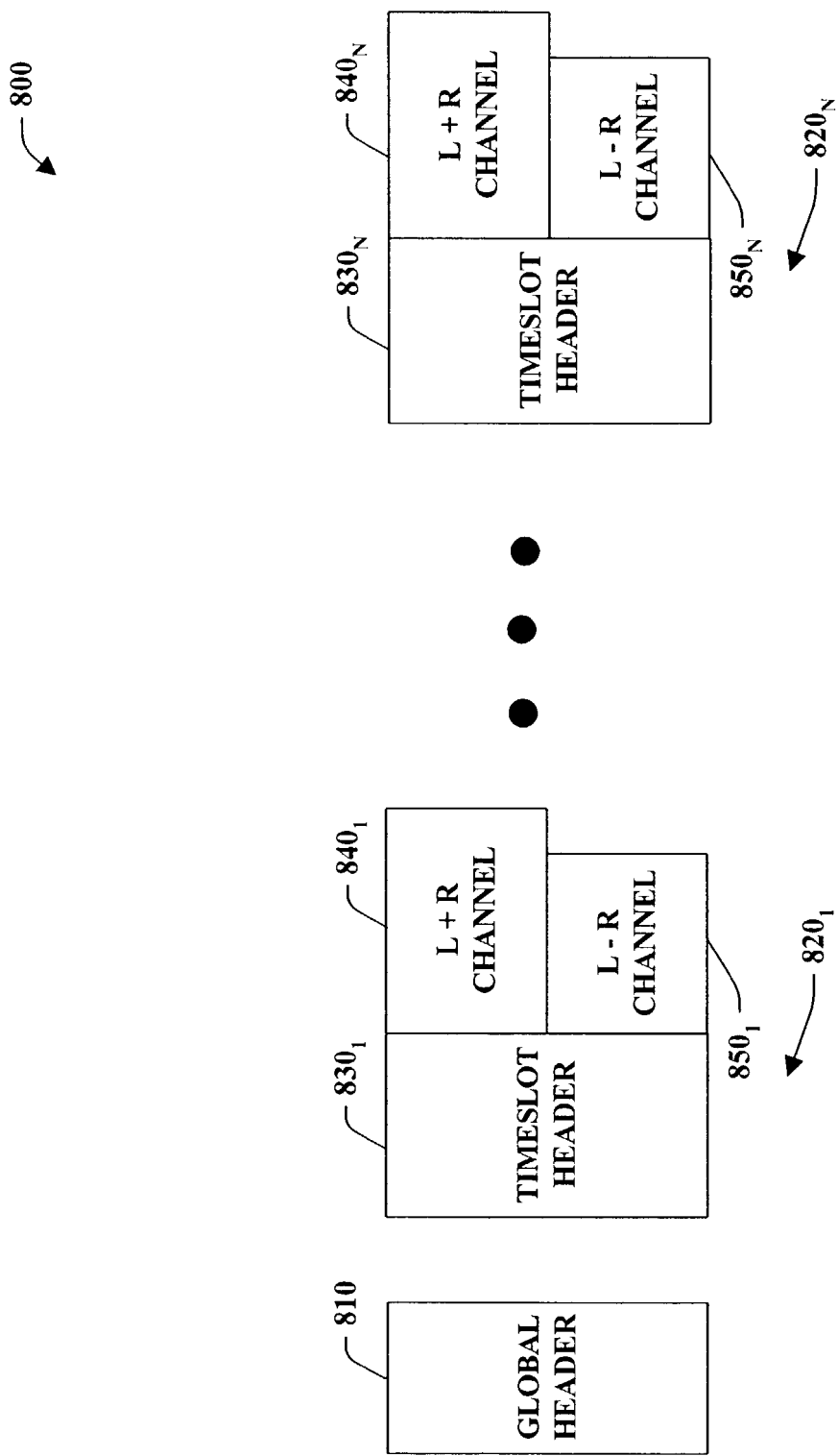
FIG. 8 is a block diagram of an exemplary bit stream in accordance with an aspect of the present invention.

An exemplary bit stream 800 in accordance with an aspect of the present invention is illustrated in FIG. 8. The bit stream 800 comprises a global header 810, which is followed by a first timeslot $820_1$ through an $N^{th}$ timeslot $820_N$, N being an integer greater than or equal to one. Each timeslot 820 comprises a timeslot header 830, which records the length of the compressed bit stream in the L+R and L−R channels, and is followed by the actual embedded bit stream of the channels 840, 850. If exact waveform reconstruction is required, the entire bit stream will be decoded. In case higher compression ratio is called for, a subset from the losslessly encoded bit stream to form a bit stream of higher compression ratio is extracted. Since this is achieved by truncating the embedded bit stream of the L+R and L−R channels of individual timeslot, the operation can be performed very fast. It is also possible to convert the compressed audio from stereo to mono by removing the compressed bit stream associated with the L−R channel.

Turning back to FIG. 7, the bit stream assembler 720 thus allocates the available coding bit rate among multiple timeslots and channels, truncates the embedded bit stream of each timeslot and channel according to the allocated bit rate, and produces a final compressed bit stream.

It is to be appreciated that the system 700, the reversible multiplexer 710 and/or the bit stream assembler 720 can be computer components as that term is defined herein.

Figure 9:
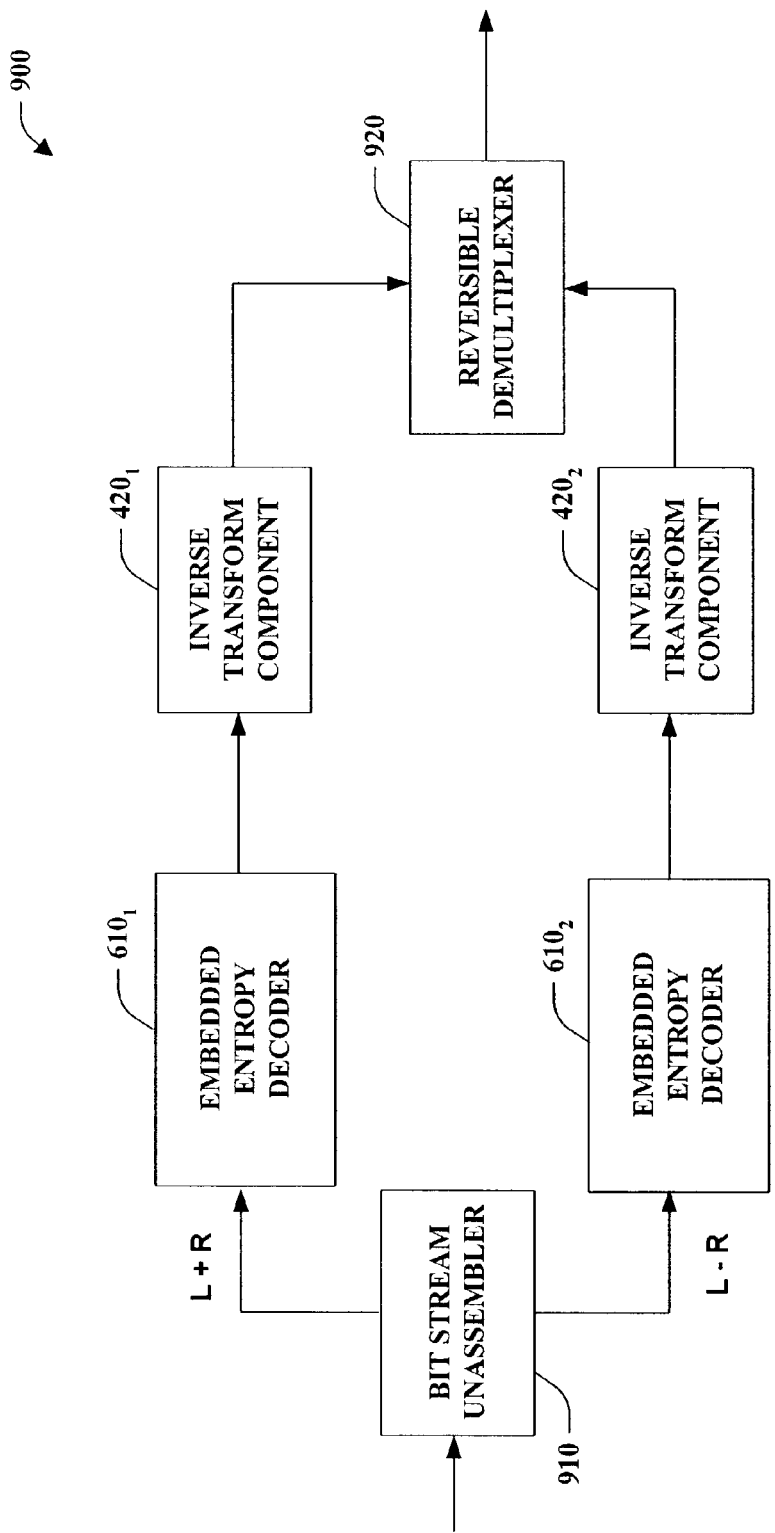
FIG. 9 is a block diagram of a progressive to lossless audiodecoder system in accordance with an aspect of the present invention.

Referring next to FIG. 9, a progressive to lossless audio decoder system 900 in accordance with an aspect of the present invention is illustrated. The system 900 comprises a bit stream unassembler 910, embedded entropy decoders $610_1$, $610_2$, inverse transform components $420_1$, $420_2$ and a reversible demultiplexer 920.

The bit stream unassembler 910 receives an input bit stream (e.g., from a corresponding bit stream assembler 720). The bit stream unassembler separates the L+R channel and the L−R channel and provides the separated channels to the embedded entropy decoders $610_1$, $610_2$.

Each of the embedded entropy decoders $610_1$, $610_2$ receives a channel of information from the bit stream unassembler 910 and decodes the bit stream. Thus, the embedded entropy decoders $610_1$, $610_2$ digitally entropy decodes the input bit stream and provides the decoded information to the inverse transform components $420_1$, $420_2$.

The inverse transform components $420_1$, $420_2$ receive output values from the embedded entropy decoders $610_1$, $610_2$. The inverse transform components $420_1$, $420_2$ transform the output values from the embedded entropy decoders $610_1$, $610_2$ and provides output values. In one example, the inverse transform components $420_1$, $420_2$ utilize an inverse reversible MLT, to essentially revert the computations in the multiple factorization reversible transform component 110.

The reversible demultiplexer 920 receives the outputs of the inverse transform components $420_1$, $420_2$ and demultiplexes the outputs into a stereo audio waveform.

It is to be appreciated that the system 900, the bit stream unassembler 910 and/or the reversible demultiplexer 920 can be computer components as that term is defined herein.

Turning briefly to FIGS. 10, 11, 12, 13 and 14, methodologies that may be implemented in accordance with the present invention are illustrated. While, for purposes of simplicity of explanation, the methodologies are shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement the methodologies in accordance with the present invention.

The invention may be described in the general context of computer-executable instructions, such as program modules, executed by one or more components. Generally, program modules include routines, programs, objects, data structures, etc. that perform particular tasks or implement particular abstract data types. Typically the functionality of the program modules may be combined or distributed as desired in various embodiments.

Figure 10:
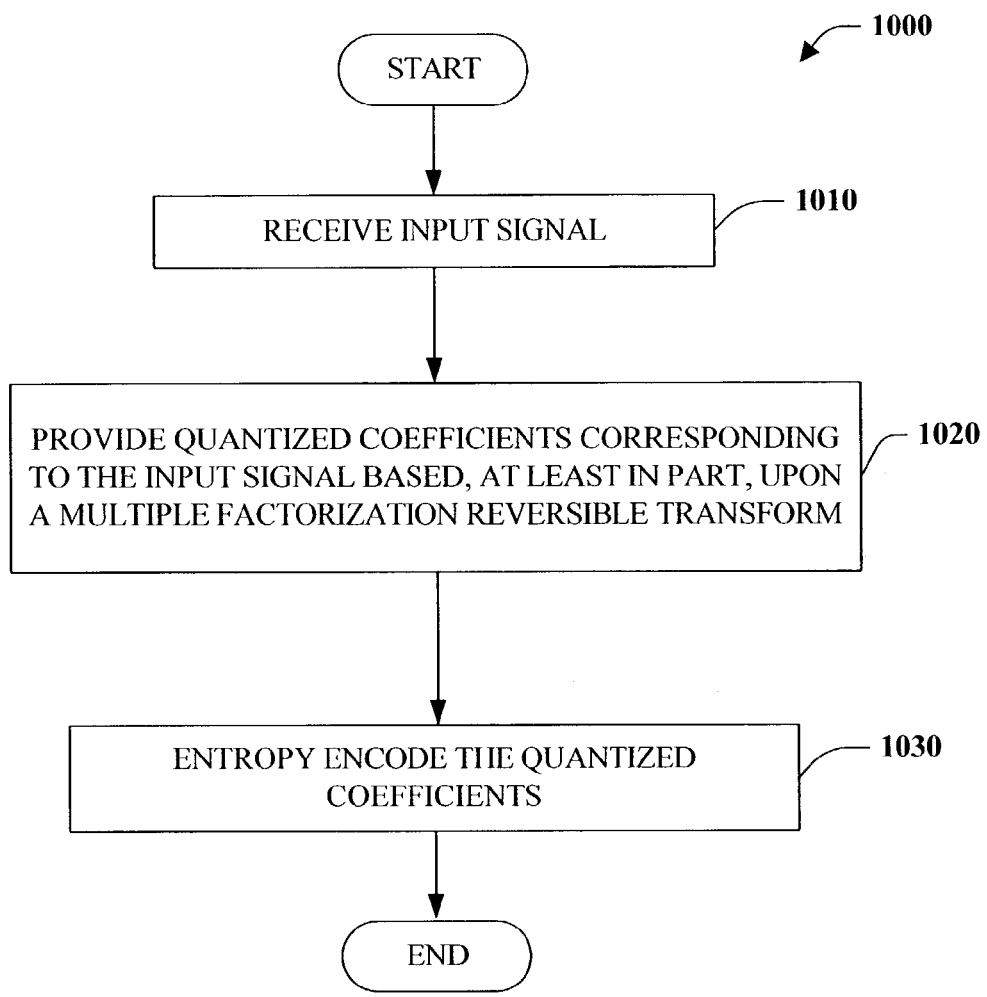
FIG. 10 is a flow chart flow chart illustrating a method for lossless data encoding in accordance with an aspect of the present invention.

Referring to FIG. 10, a method for lossless data encoding 1000 in accordance with an aspect of the present invention is illustrated. At 1010, an input signal is received (e.g., audio and/or image). At 1020, quantized coefficients corresponding to the input signal based, at least in part, upon a multiple factorization reversible transform (e.g., reversible modulated lapped transform) is provided. For example, the reversible modulated lapped transform can be based upon equations (3), (4), (5), (6), (9), (10) and/or (11). The multiple factorization reversible transform can comprise a modulation stage, a pre-FFT rotation stage, a complex FFT stage and/or a post-FFT rotation stage. At 1030, the quantized coefficients are entropy encoded.

Figure 11:
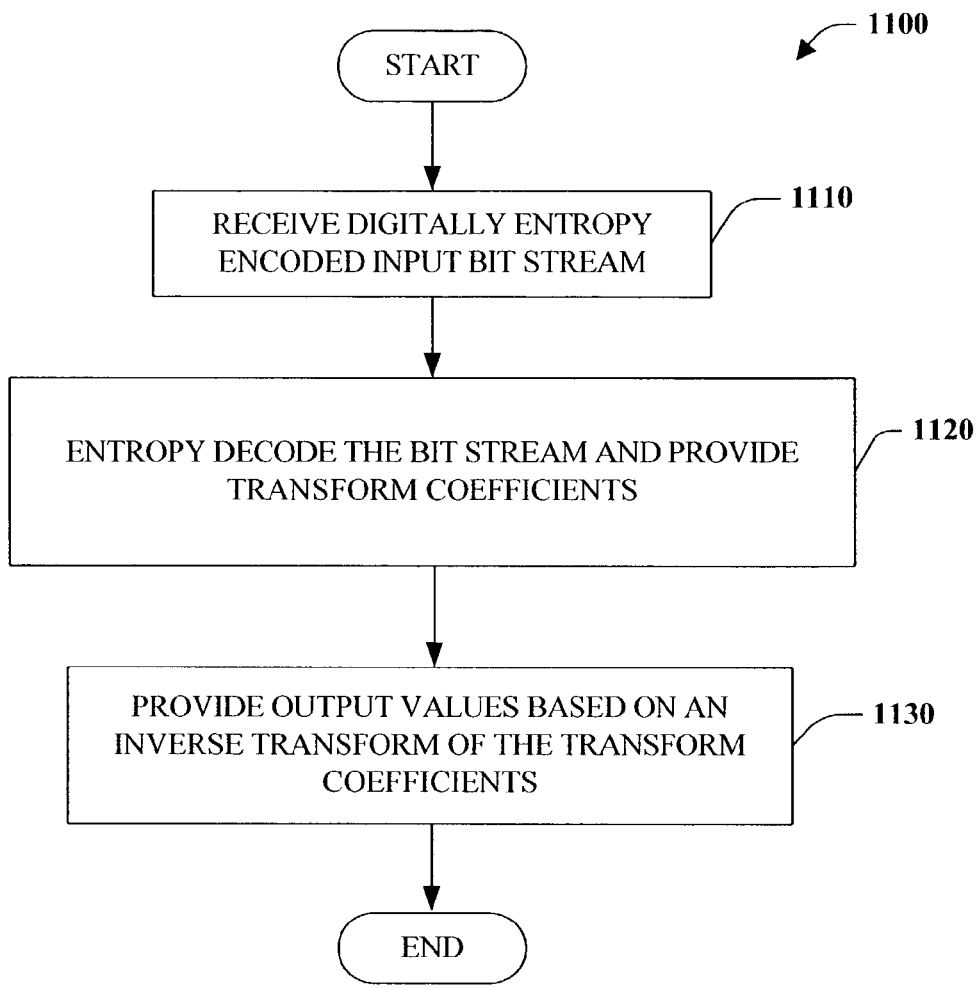
FIG. 11 is a flow chart illustrating a method for lossless data decoding in accordance with an aspect of the present invention.

Next, turning to FIG. 11, a method for lossless data decoding 1100 in accordance with an aspect of the present invention is illustrated. At 1110, a digitally entropy encoded input bit stream is received. At 1120, the bit stream is entropy decoded and transform coefficients are provided. At 1130, output values based on an inverse transform of the transform coefficients are provided. The inverse transform can be based on a reversible modulated lapped transform.

Figure 12:
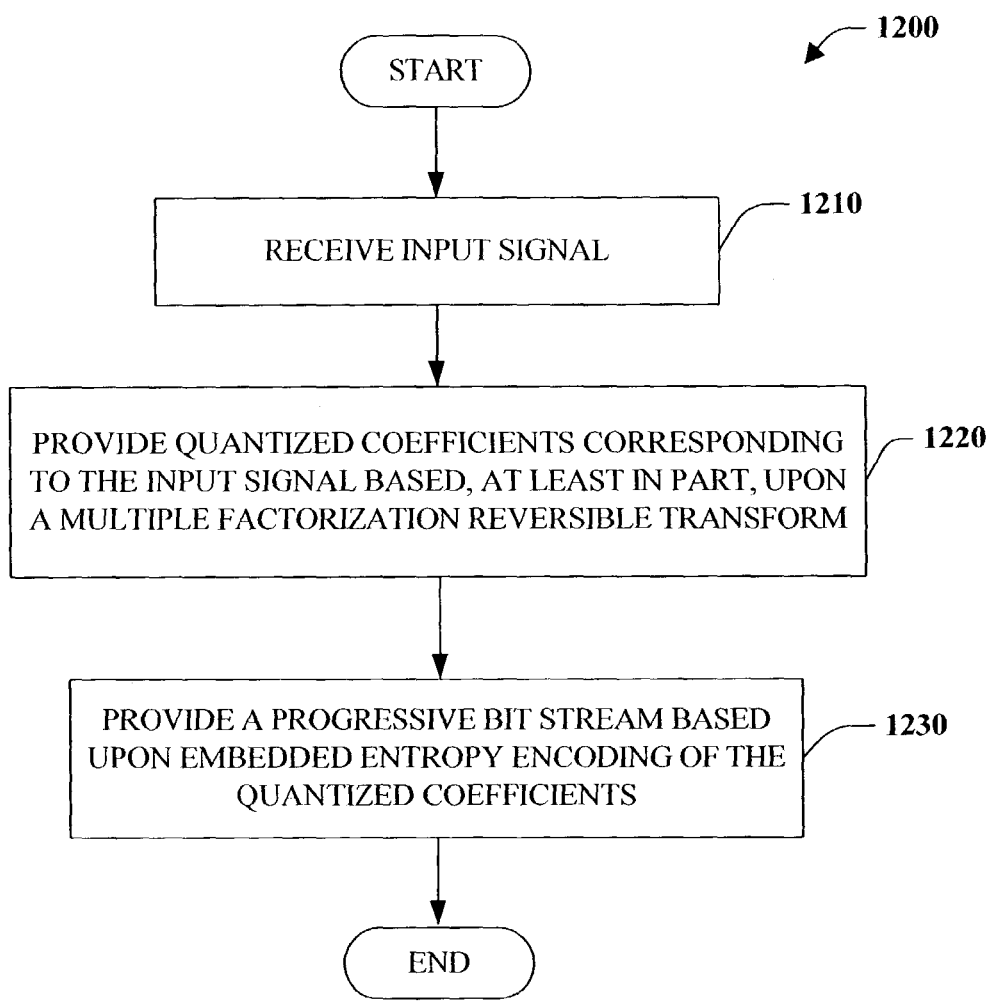
FIG. 12 is a flow chart illustrating a method for progressive to lossless data encoding in accordance with an aspect of the present invention.

Referring to FIG. 12, a method for progressive to lossless data encoding 1200 in accordance with an aspect of the present invention is illustrated. At 1210, an input signal is received (e.g., audio and/or image). At 1220, quantized coefficients corresponding to the input signal based, at least in part, upon a multiple factorization reversible transform (e.g., reversible modulated lapped transform) is provided. For example, the multiple factorization reversible transform can be based upon equations (3), (4), (5), (6), (9), (10) and/or (11). The multiple factorization reversible transform can comprise a modulation stage, a pre-FFT rotation stage, a complex FFT stage and/or a post-FFT rotation stage. At 1230, a progressive bit stream based upon embedded encoding of the quantized coefficients is provided.

Figure 13:
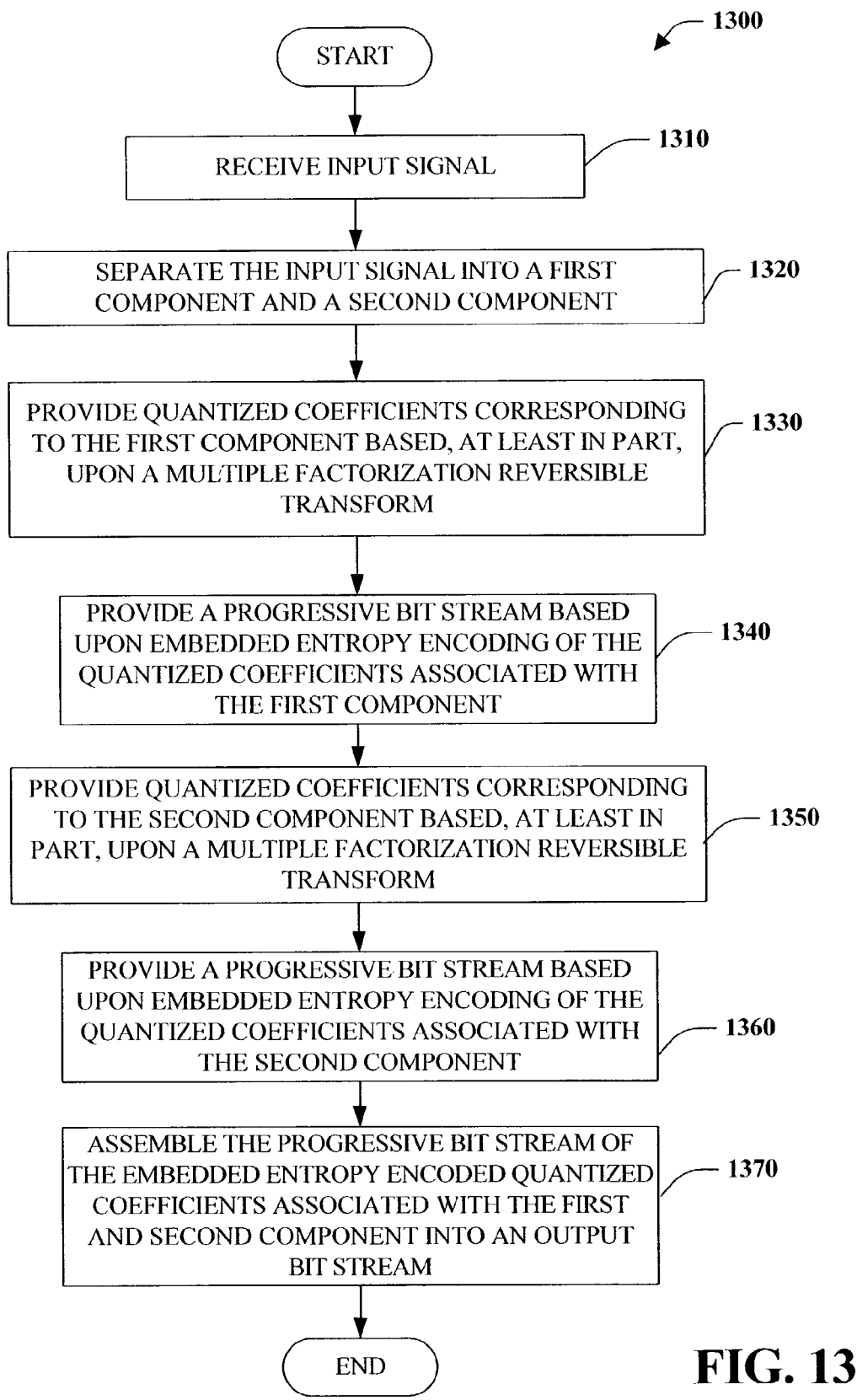
FIG. 13 is a flow chart illustrating a method for progressive to lossless audio encoding in accordance with an aspect of the present invention.

Turning to FIG. 13, a method for progressive to lossless audio encoding 1300 in accordance with an aspect of the present invention is illustrated. At 1310, an input signal is received. At 1320, the input signal is separated into a first component (L+R) and a second component (L−R) (e.g., by a reversible multiplexer 710).

At 1330, quantized coefficients corresponding to the first component based, at least in part, upon a multiple factorization reversible transform (e.g., reversible modulated lapped transform) are provided. For example, the multiple factorization reversible lapped transform can be based upon equations (3), (4), (5), (6), (9), (10) and/or (11). The multiple factorization reversible transform can comprise a modulation stage, a pre-FFT rotation stage, a complex FFT stage and/or a post-FFT rotation stage. At 1340, a progressive bit stream based upon embedded encoding of the quantized coefficients associated with the first component is provided.

At 1350, quantized coefficients corresponding to the second component based, at least in part, upon a multiple factorization reversible transform (e.g., reversible modulated lapped transform) are provided. For example, the multiple factorization reversible transform can be based upon equations (3), (4), (5), (6), (9), (10) and/or (11). The multiple factorization reversible transform can comprise a modulation stage, a pre-FFT rotation stage, a complex FFT stage and/or a post-FFT rotation stage. At 1360, a progressive bit stream based upon embedded encoding of the quantized coefficients associated with the second component is provided.

At 1370, the progressive bit stream of the embedded entropy encoded quantized coefficients associated with the first and second component are assembled into an output bit stream (e.g., by a bit stream assembler 720).

Figure 14:
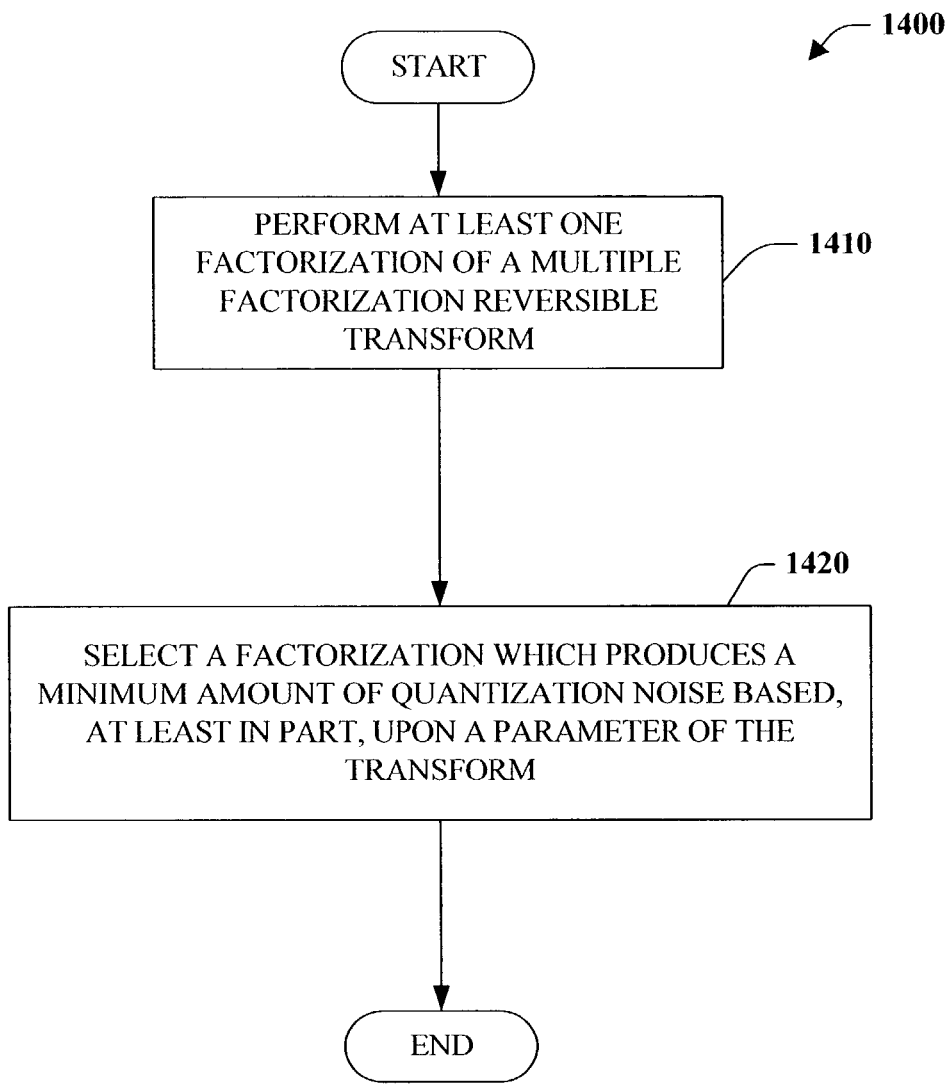
FIG. 14 is flow chart illustrating a method of multiple factorization reversible transform in accordance with an aspect of the present invention.

Referring to FIG. 14, a method of multiple factorization reversible transform 1400 in accordance with an aspect of the present invention is illustrated. At 1410, at least one factorization of the multiple factorization reversible transform is performed. At 1420, a factorization which produces a minimum amount of quantization noise based, at least in part, upon a parameter of the transform, is selected. For example, the factorization can be based upon equations (3), (4), (5), (6), (9), (10) and/or (11). The factorization can comprise a modulation stage, a pre-FFT rotation stage, a complex FFT stage and/or a post-FFT rotation stage as set forth supra.

Figure 15:
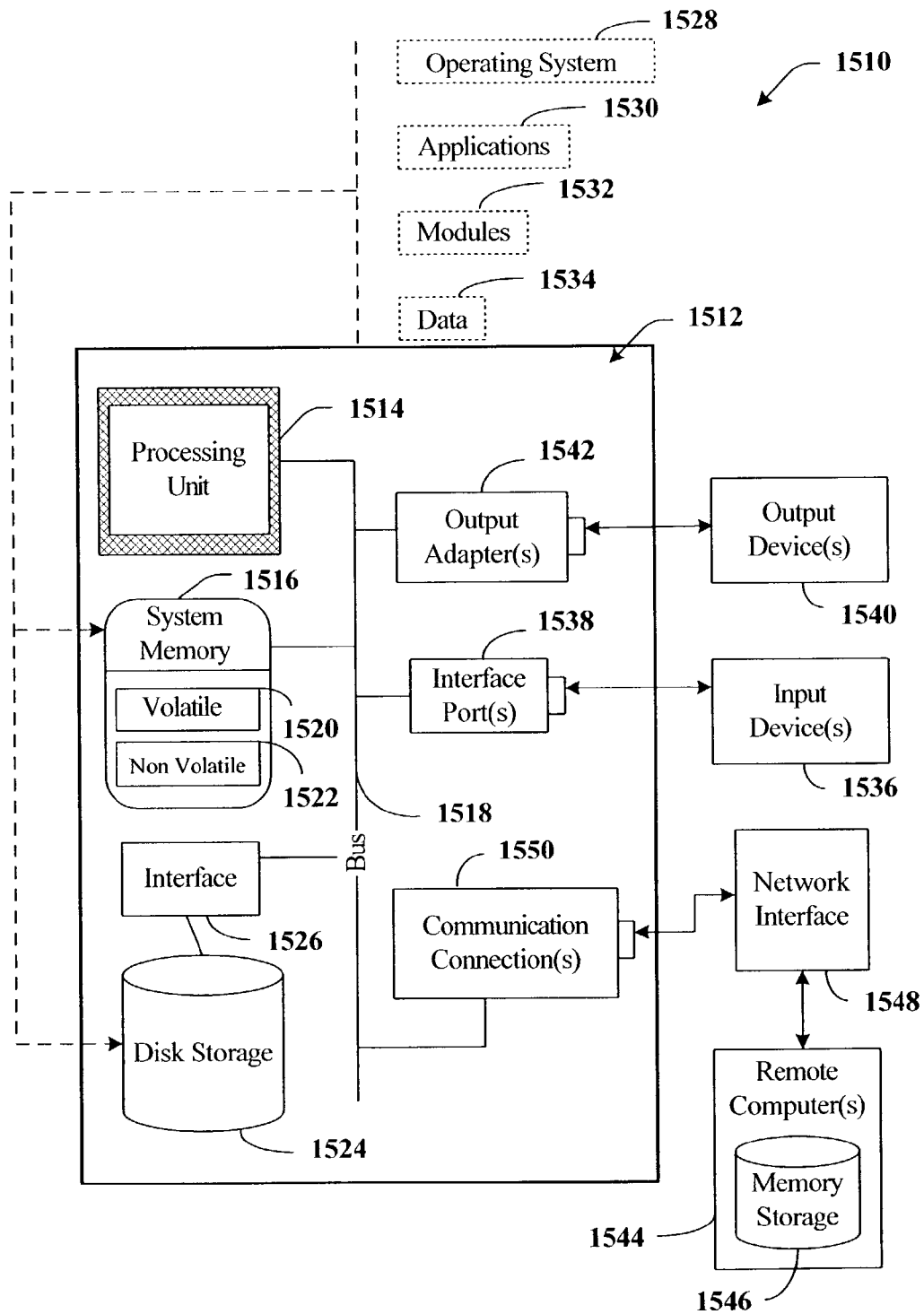
FIG. 15 illustrates an example operating environment in which the present invention may function.

In order to provide additional context for various aspects of the present invention, FIG. 15 and the following discussion are intended to provide a brief, general description of a suitable operating environment 1510 in which various aspects of the present invention may be implemented. While the invention is described in the general context of computer-executable instructions, such as program modules, executed by one or more computers or other devices, those skilled in the art will recognize that the invention can also be implemented in combination with other program modules and/or as a combination of hardware and software. Generally, however, program modules include routines, programs, objects, components, data structures, etc. that perform particular tasks or implement particular data types. The operating environment 1510 is only one example of a suitable operating environment and is not intended to suggest any limitation as to the scope of use or functionality of the invention. Other well known computer systems, environments, and/or configurations that may be suitable for use with the invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 15, an exemplary environment 1510 for implementing various aspects of the invention includes a computer 1512. The computer 1512 includes a processing unit 1514, a system memory 1516, and a system bus 1518. The system bus 1518 couples system components including, but not limited to, the system memory 1516 to the processing unit 1514. The processing unit 1514 can be any of various available processors. Dual microprocessors and other multiprocessor architectures also can be employed as the processing unit 1514.

The system bus 1518 can be any of several types of bus structure(s) including the memory bus or memory controller, a peripheral bus or external bus, and/or a local bus using any variety of available bus architectures including, but not limited to, 16-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1516 includes volatile memory 1520 and nonvolatile memory 1522. The basic input/output system (BIOS), containing the basic routines to transfer information between elements within the computer 1512, such as during start-up, is stored in nonvolatile memory 1522. By way of illustration, and not limitation, nonvolatile memory 1522 can include read only memory (ROM), programmable ROM (PROM), electrically programmable ROM (EPROM), electrically erasable ROM (EEPROM), or flash memory. Volatile memory 1520 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1512 also includes removable/nonremovable, volatile/nonvolatile computer storage media. FIG. 15 illustrates, for example a disk storage 1524. Disk storage 1524 includes, but is not limited to, devices like a magnetic disk drive, floppy disk drive, tape drive, Jaz drive, Zip drive, LS-100 drive, flash memory card, or memory stick. In addition, disk storage 1524 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1524 to the system bus 1518, a removable or non-removable interface is typically used such as interface 1526.

It is to be appreciated that FIG. 15 describes software that acts as an intermediary between users and the basic computer resources described in suitable operating environment 1510. Such software includes an operating system 1528. Operating system 1528, which can be stored on disk storage 1524, acts to control and allocate resources of the computer system 1512. System applications 1530 take advantage of the management of resources by operating system 1528 through program modules 1532 and program data 1534 stored either in system memory 1516 or on disk storage 1524. It is to be appreciated that the present invention can be implemented with various operating systems or combinations of operating systems.

A user enters commands or information into the computer 1512 through input device(s) 1536. Input devices 1536 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1514 through the system bus 1518 via interface port(s) 1538. Interface port(s) 1538 include, for example, a serial port, a parallel port, a game port, and a universal serial bus (USB). Output device(s) 1540 use some of the same type of ports as input device(s) 1536. Thus, for example, a USB port may be used to provide input to computer 1512, and to output information from computer 1512 to an output device 1540. Output adapter 1542 is provided to illustrate that there are some output devices 1540 like monitors, speakers, and printers among other output devices 1540 that require special adapters. The output adapters 1542 include, by way of illustration and not limitation, video and sound cards that provide a means of connection between the output device 1540 and the system bus 1518. It should be noted that other devices and/or systems of devices provide both input and output capabilities such as remote computer(s) 1544.

Computer 1512 can operate in a networked environment using logical connections to one or more remote computers, such as remote computer(s) 1544. The remote computer(s) 1544 can be a personal computer, a server, a router, a network PC, a workstation, a microprocessor based appliance, a peer device or other common network node and the like, and typically includes many or all of the elements described relative to computer 1512. For purposes of brevity, only a memory storage device 1546 is illustrated with remote computer(s) 1544. Remote computer(s) 1544 is logically connected to computer 1512 through a network interface 1548 and then physically connected via communication connection 1550. Network interface 1548 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1550 refers to the hardware/software employed to connect the network interface 1548 to the bus 1518. While communication connection 1550 is shown for illustrative clarity inside computer 1512, it can also be external to computer 1512. The hardware/software necessary for connection to the network interface 1548 includes, for exemplary purposes only, internal and external technologies such as, modems including regular telephone grade modems, cable modems and DSL modems, ISDN adapters, and Ethernet cards.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A lossless data coder system comprising:
   a multiple factorization reversible transform component that receives an input signal and provides an output of quantized coefficients corresponding to the input signal, the output of quantized coefficients being based, at least in part, upon a multiple factorization reversible transform that switches between multiple reversible forms based upon a reversible rotation parameter of the transform; and, an entropy encoder that digitally entropy encodes the quantized coefficients.

2. The system of claim 1, wherein the multiple factorization reversible transform is a multiple factorization reversible MLT.

3. The system of claim 2, wherein the multiple factorization reversible MLT further comprises a modulation stage, a pre-FFT rotation stage, a complex FFT stage and a post-FFT rotation stage.

4. The system of claim 3, wherein the modulation stage is implemented via a multiple factorization reversible rotation:

$$\begin{bmatrix} \cos\theta & -\sin\theta \\ \sin\theta & \cos\theta \end{bmatrix} = \begin{bmatrix} 1 & \frac{\cos\theta-1}{\sin\theta} \\ 0 & 1 \end{bmatrix} \cdot \begin{bmatrix} 1 & 0 \\ \sin\theta & 1 \end{bmatrix} \cdot \begin{bmatrix} 1 & \frac{\cos\theta-1}{\sin\theta} \\ 0 & 1 \end{bmatrix}$$

where θ is an angle of rotation.

5. The system of claim 3, wherein the pre-FFT rotation is implemented via multiple factorization reversible rotation:

$$\begin{bmatrix} \cos\theta & -\sin\theta \\ \sin\theta & \cos\theta \end{bmatrix} = \begin{bmatrix} 1 & \frac{\cos\theta-1}{\sin\theta} \\ 0 & 1 \end{bmatrix} \cdot \begin{bmatrix} 1 & 0 \\ \sin\theta & 1 \end{bmatrix} \cdot \begin{bmatrix} 1 & \frac{\cos\theta-1}{\sin\theta} \\ 0 & 1 \end{bmatrix}$$

where θ is an angle of rotation.

6. The system of claim 1, wherein the complex FFT is implemented via:

$$\begin{bmatrix} y_c(i) \\ y_c(j) \end{bmatrix} = \begin{bmatrix} 1 & 0 \\ 0 & e^{-j\pi\omega} \end{bmatrix} \begin{bmatrix} \cos\pi/4 & -\sin\pi/4 \\ \sin\pi/4 & \cos\pi/4 \end{bmatrix} \cdot \begin{bmatrix} x_c(i) \\ x_c(j) \end{bmatrix},$$

where $x_c(i)$ is a complex number representation of a first channel of the input signal, $x_c(j)$ is a complex number representation of a second channel of the input signal, ω is an angle of rotation, wherein the reversible complex butterfly is implemented via first a 0.25π multiple factorization reversible rotation of the pair of variables formed by the real and imaginary part of the two channels of the input signal, and then a multiple factorization reversible complex rotation ω of the second channel.

7. The system of claim 3, wherein the post-FFT rotation is implemented via:

$$\begin{bmatrix} x' \\ y' \end{bmatrix} = \begin{bmatrix} \cos\theta & -\sin\theta \\ -\sin\theta & -\cos\theta \end{bmatrix} \begin{bmatrix} x \\ y \end{bmatrix} = \begin{bmatrix} 1 & 0 \\ 0 & -1 \end{bmatrix} \begin{bmatrix} \cos\theta & -\sin\theta \\ \sin\theta & \cos\theta \end{bmatrix} \begin{bmatrix} x \\ y \end{bmatrix}$$

where θ is an angle of rotation,
x is a first channel of the input signal,
y is a second channel of the input signal,
x' is a first multiplexed channel of the input signal,
y' is a second multiplexed channel of the input signal, wherein the multiple factorization reversible conjugated rotation is implemented via first a multiple factorization reversible rotation, and then a reversal of the sign of an imaginary part.

8. The system of claim 1, wherein the multiple factorization reversible transform component comprises a plurality of basic transform components and at least one of the basic transform components is a reversible rotation.

9. A picture coder system employing the system of claim 1.

10. An audio coder system employing the system of claim 1.

11. The system of claim 1 wherein the reversible transform component employs the following operation to perform the multiplication and integerize operations:

```
__asm
{
    MOV     eax, y;
    IMUL    c;                     // edx:eax = x*y;
    SHL     edx, SHIFT_REST;
    SHR     eax, SHIFT_INT;
    ADC     eax, edx;
}.
```

12. A lossless data decoder system comprising:
an entropy decoder that digitally entropy decodes an input bit stream and provides transform coefficients; and,
an inverse transform component that receives the transform coefficients from the entropy decoder and provides output values based, at least in part, upon an inverse reversible modulated lapped transform of the transform coefficients, to revert computations from a multiple factorization reversible transform, the multiple factorization reversible transform using multiple reversible forms that were switched between based on a reversible rotation parameter of the transform so as to minimize quantization noise.

13. A picture decoder system employing the system of claim 12.

14. An audio decoder system employing the system of claim 12.

15. A progressive to lossless data coder system comprising:
a multiple factorization reversible transform component that receives an input signal and provides an output of quantized coefficients corresponding to the input signal, the output of quantized coefficients being based, at least in part, upon a multiple factorization reversible transform that switches between multiple reversible forms based upon a reversible rotation parameter of the transform; and,
an embedded entropy encoder that digitally entropy encodes the quantized coefficients into a progressive bit stream.

16. The system of claim 15, wherein the multiple factorization reversible transform is at least one of a reversible modulated lapped transform, a reversible DCT, a reversible DST and a reversible FFT.

17. The system of claim 15, wherein the multiple factorization reversible transform component comprises a plurality of basic transform components.

18. The system of claim 17, wherein at least one of the basic transform components is a reversible rotation.

19. The system of claim 18, wherein the reversible rotation is implemented via:

$$\begin{bmatrix} \cos\theta & -\sin\theta \\ \sin\theta & \cos\theta \end{bmatrix} = \begin{bmatrix} 1 & \frac{\cos\theta-1}{\sin\theta} \\ 0 & 1 \end{bmatrix} \cdot \begin{bmatrix} 1 & 0 \\ \sin\theta & 1 \end{bmatrix} \cdot \begin{bmatrix} 1 & \frac{\cos\theta-1}{\sin\theta} \\ 0 & 1 \end{bmatrix}$$

where θ is an angle of rotation.

20. The system of claim 18, wherein the reversible rotation is implemented via:

$$\begin{bmatrix} \cos\theta & -\sin\theta \\ \sin\theta & \cos\theta \end{bmatrix} = \begin{bmatrix} 1 & 0 \\ -1 & 0 \end{bmatrix} \begin{bmatrix} 1 & \frac{-\sin\theta-1}{\cos\theta} \\ 0 & 1 \end{bmatrix} \cdot$$

$$\begin{bmatrix} 1 & 0 \\ \cos\theta & 1 \end{bmatrix} \cdot \begin{bmatrix} 1 & \frac{-\sin\theta-1}{\cos\theta} \\ 0 & 1 \end{bmatrix}$$

where θ is an angle of rotation.

21. The system of claim 18, wherein the reversible rotation is implemented via:

$$\begin{bmatrix} \cos\theta & -\sin\theta \\ \sin\theta & \cos\theta \end{bmatrix} = \begin{bmatrix} -1 & 0 \\ 0 & 1 \end{bmatrix} \begin{bmatrix} 1 & \frac{\sin\theta-1}{\cos\theta} \\ 0 & 1 \end{bmatrix} \cdot \begin{bmatrix} 1 & 0 \\ \cos\theta & 1 \end{bmatrix} \cdot$$

$$\begin{bmatrix} 1 & \frac{\sin\theta-1}{\cos\theta} \\ 0 & 1 \end{bmatrix} \begin{bmatrix} 0 & 1 \\ 1 & 0 \end{bmatrix}$$

where θ is an angle of rotation.

22. The system of claim 18, wherein the reversible rotation is implemented via:

$$\begin{bmatrix} \cos\theta & -\sin\theta \\ \sin\theta & \cos\theta \end{bmatrix} = \begin{bmatrix} -1 & 0 \\ 0 & 1 \end{bmatrix} \begin{bmatrix} 1 & \frac{-\cos\theta-1}{\sin\theta} \\ 0 & 1 \end{bmatrix} \cdot \begin{bmatrix} 1 & 0 \\ \sin\theta & 1 \end{bmatrix} \cdot$$

$$\begin{bmatrix} 1 & \frac{-\cos\theta-1}{\sin\theta} \\ 0 & 1 \end{bmatrix} \begin{bmatrix} 1 & 0 \\ 0 & -1 \end{bmatrix}$$

where θ is an angle of rotation.

23. The system of claim 15, wherein the multiple factorization reversible transform component utilizing the reversible butterfly:

$$\begin{bmatrix} y_c(i) \\ y_c(j) \end{bmatrix} = \begin{bmatrix} 1 & 0 \\ 0 & e^{-j\pi\omega} \end{bmatrix} \begin{bmatrix} 1/\sqrt{2} & -1\sqrt{2} \\ 1/\sqrt{2} & 1/\sqrt{2} \end{bmatrix} \cdot \begin{bmatrix} x_c(i) \\ x_c(j) \end{bmatrix},$$

where $x_c(i)$ is a complex number representation of a first channel of the input signal, $y_c(j)$ is a complex number representation of a second channel of the input signal, ω is an angle of rotation.

24. The system of claim 15, wherein the multiple factorization reversible transform component utilizing the reversible conjugated rotation:

$$\begin{bmatrix} x' \\ y' \end{bmatrix} = \begin{bmatrix} \cos\theta & -\sin\theta \\ -\sin\theta & -\cos\theta \end{bmatrix} \begin{bmatrix} x \\ y \end{bmatrix} = \begin{bmatrix} 1 & 0 \\ 0 & -1 \end{bmatrix} \begin{bmatrix} \cos\theta & -\sin\theta \\ \sin\theta & \cos\theta \end{bmatrix} \begin{bmatrix} x \\ y \end{bmatrix}$$

where θ is an angle of rotation,
x is a first channel of the input signal,
y is a second channel of the input signal,
x' is a first multiplexed channel of the input signal,
y' is a second multiplexed channel of the input signal.

25. The system of claim 15, the multiple factorization reversible transform component further comprising a modulation stage, a pre-FFT rotation stage, a complex FFT stage and a post-FFT rotation stage.

26. A picture coder system employing the system of claim 15.

27. An audio coder system employing the system of claim 15.

28. A progressive to lossless data decoder system comprising:
an embedded entropy decoder that digitally entropy decodes a progressively encoded input bit stream and provides transform coefficients; and,
an inverse transform component that receives the transform coefficients from the embedded entropy decoder and provides output values based, at least in part, upon an inverse reversible modulated lapped transform to revert computations from a multiple factorization reversible transform, the multiple factorization reversible transform using multiple reversible forms that were switched between based on a reversible rotation parameter of the transform so as to minimize quantization noise.

29. A progressive to lossless stereo audio coder system comprising:
a reversible multiplexer that receives an input audio waveform and separates the input audio waveform into a first component and a second component;
a first multiple factorization reversible transform component that receives the first component and provides an output of quantized coefficients corresponding to the first component, the output of quantized coefficients being based, at least in part, upon multiple reversible forms that are switched between based, at least in part, upon a reversible rotation parameter of the transform;
a second multiple factorization reversible transform component that receives the second component and provides an output of quantized coefficients corresponding to the second component, the output of quantized coefficients being based, at least in part, upon multiple reversible forms that are switched between based, at least in part, upon a reversible rotation parameter of the transform;
a first embedded entropy encoder that digitally entropy encodes the quantized coefficients of the first multiple factorization reversible transform component into a progressive bit stream;
a second embedded entropy encoder that digitally entropy encodes the quantized coefficients of the second multiple factorization reversible transform component into a progressive bit stream; and,
a bit stream assembler that assembles the progressive bit stream of the first embedded entropy encoder and the second embedded entropy encoder into a progressive bit stream.

30. The system of claim 29, where the reversible multiplexer is implemented via:

$$\begin{bmatrix} x' \\ y' \end{bmatrix} = \begin{bmatrix} 1 & -1/2 \\ 0 & 1 \end{bmatrix} \begin{bmatrix} 1 & 0 \\ 1 & -1 \end{bmatrix} \begin{bmatrix} x \\ y \end{bmatrix},$$

where x is the first component, y is the second component, x' is the first output component, y' is the second output component.

31. A progressive to lossless audio decoder system comprising:
a bit stream unassembler that unassembles a progressively encoded input bit stream into a first channel and a second channel;
a first embedded entropy decoder that digitally entropy decodes the first channel of progressively encoded input bit stream and provides transform coefficients;
a second embedded entropy decoder that digitally entropy decodes the second channel of progressively encoded input bit stream and provides transform coefficients;
a first inverse transform component that receives the transform coefficients from the first embedded entropy decoder and provides output values based, at least in part, upon an inverse reversible transform to revert computations from a multiple factorization reversible transform, the multiple factorization reversible transform using multiple reversible forms that were switched between based on a reversible rotation parameter of the transform so as to minimize quantization noise;
a second inverse transform component that receives the transform coefficients from the second embedded entropy decoder and provides output values based, at least in part, upon an inverse reversible transform to revert computations from a multiple factorization reversible transform, the multiple factorization reversible transform using multiple reversible forms that were switched between based on a reversible rotation parameter of the transform so as to minimize quantization noise; and,
a reversible demultiplexer that combines the outputs of the first inverse transform component and the second inverse transform component into an audio output to revert computations from a multiple factorization reversible transform, the multiple factorization reversible transform using multiple reversible forms that were switched between based on a reversible parameter of the transform so as to minimize quantization noise.

32. A method for lossless data encoding comprising:
receiving an input signal; and,
providing quantized coefficients corresponding to the input signal, the quantized coefficients being based, at least in part, upon a multiple factorization reversible transform that switches between multiple reversible forms based on a reversible rotation parameter of the transform.

33. The method of claim 32, further comprising at least one of the following acts:
entropy encoding the quantized coefficients; and,
the multiple factorization reversible transform comprising a modulation stage, a pre-FFT rotation stage, a complex FFT stage and a post-FFT rotation stage.

34. A method for lossless data decoding comprising:
receiving a digitally entropy encoded input bit stream;
entropy decoding the input bit stream and providing transform coefficients; and,
providing output values based on an inverse transform of the transform coefficients, the inverse transform being based, at least in part, upon an inverse reversible modulated lapped transform to revert computations from a multiple factorization reversible transform, the multiple factorization reversible transform using multiple reversible forms that were switched between based on a reversible rotation parameter of the transform so as to minimize quantization noise.

35. A method for progressive to lossless audio encoding comprising:
receiving an input signal;
providing quantized coefficients corresponding to the input signal, the quantized coefficients being based, at least in part, upon a multiple factorization reversible transform that switches between multiple reversible forms based, at least in part, on a reversible rotation parameter of the transform; and,
providing a progressive bit stream based upon embedded entropy encoding the quantized coefficients.

36. The method of claim 35, further comprising at least one of the following acts:
the multiple factorization reversible transform comprising a modulation stage, a pre-FFT rotation stage, a complex FFT stage and a post-FFT rotation stage;
separating the input signal into a first component and a second component; and,
assembling an output bit stream of the embedded entropy encoded quantized coefficients associated with the first component and the second component.

37. A method of multiple factorization reversible transform, the method comprising:
switching between at least two factorizations of the multiple factorization reversible transform based, at least in part, upon a reversible rotation parameter of the transform.

38. The method of claim 37, wherein one factorization of the multiple factorization reversible rotation is implemented via:

$$\begin{bmatrix} \cos\theta & -\sin\theta \\ \sin\theta & \cos\theta \end{bmatrix} = \begin{bmatrix} 1 & \frac{\cos\theta-1}{\sin\theta} \\ 0 & 1 \end{bmatrix} \cdot \begin{bmatrix} 1 & 0 \\ \sin\theta & 1 \end{bmatrix} \cdot \begin{bmatrix} 1 & \frac{\cos\theta-1}{\sin\theta} \\ 0 & 1 \end{bmatrix}$$

where $\theta$ is an angle of rotation.

39. The method of claim 38, wherein for the one factorization of the multiple factorization reversible rotation is implemented for the rotating angle $\theta$ in the range of about $-0.25\pi$ to about $0.25\pi$.

40. The method of claim 38, wherein for the one factorization of the multiple factorization reversible rotation is implemented for the rotation angle $\theta$ in the range of about $-0.5\pi$ to about $0.5\pi$.

41. The method of claim 37, wherein one factorization of the multiple factorization reversible rotation is implemented via:

$$\begin{bmatrix} \cos\theta & -\sin\theta \\ \sin\theta & \cos\theta \end{bmatrix} = \begin{bmatrix} 0 & 1 \\ -1 & 0 \end{bmatrix} \begin{bmatrix} 1 & \frac{-\sin\theta-1}{\cos\theta} \\ 0 & 1 \end{bmatrix} \cdot \begin{bmatrix} 1 & 0 \\ \cos\theta & 1 \end{bmatrix} \cdot \begin{bmatrix} 1 & \frac{-\sin\theta-1}{\cos\theta} \\ 0 & 1 \end{bmatrix}$$

where $\theta$ is an angle of rotation.

42. The method of claim 41, wherein for the one factorization of the multiple factorization reversible rotation is implemented for the rotation angle $\theta$ in the range of about $-0.75\pi$ to about $-0.25\pi$.

43. The method of claim 37, wherein one factorization of the multiple factorization reversible rotation is implemented via:

$$\begin{bmatrix} \cos\theta & -\sin\theta \\ \sin\theta & \cos\theta \end{bmatrix} = \begin{bmatrix} -1 & 0 \\ 0 & 1 \end{bmatrix} \begin{bmatrix} 1 & \frac{\sin\theta - 1}{\cos\theta} \\ 0 & 1 \end{bmatrix} \cdot$$

$$\begin{bmatrix} 1 & 0 \\ \cos\theta & 1 \end{bmatrix} \cdot \begin{bmatrix} 1 & \frac{\sin\theta - 1}{\cos\theta} \\ 0 & 1 \end{bmatrix} \begin{bmatrix} 0 & 1 \\ 1 & 0 \end{bmatrix}$$

where θ is an angle of rotation.

44. The method of claim 43, wherein for the one factorization of the multiple factorization reversible rotation is implemented for the rotation angle θ in the range of about 0.25π to about 0.75π.

45. The method of claim 37, wherein one factorization of the multiple factorization reversible rotation is implemented via:

$$\begin{bmatrix} \cos\theta & -\sin\theta \\ \sin\theta & \cos\theta \end{bmatrix} = \begin{bmatrix} -1 & 0 \\ 0 & 1 \end{bmatrix} \begin{bmatrix} 1 & \frac{-\cos\theta - 1}{\sin\theta} \\ 0 & 1 \end{bmatrix} \cdot$$

$$\begin{bmatrix} 1 & 0 \\ \sin\theta & 1 \end{bmatrix} \cdot \begin{bmatrix} 1 & \frac{-\cos\theta - 1}{\sin\theta} \\ 0 & 1 \end{bmatrix} \begin{bmatrix} 1 & 0 \\ 0 & -1 \end{bmatrix}$$

where θ is an angle of rotation.

46. The method of claim 45, wherein for the one factorization of the multiple factorization reversible rotation is implemented for the rotation angle θ in the range of about 0.75π to about 1.25π.

47. The method of claim 45, wherein for the one factorization of the multiple factorization reversible rotation is implemented for the rotation angle θ in the range of about 0.5π to about 1.5π.

48. The method of claim 37, wherein the multiple factorization reversible transform is a multiple factorization reversible complex butterfly implemented via:

$$\begin{bmatrix} y_c(i) \\ y_c(j) \end{bmatrix} = \begin{bmatrix} 1 & 0 \\ 0 & e^{-j\pi\omega} \end{bmatrix} \begin{bmatrix} \cos\pi/4 & -\sin\pi/4 \\ \sin\pi/4 & \cos\pi/4 \end{bmatrix} \cdot \begin{bmatrix} x_c(i) \\ x_c(j) \end{bmatrix},$$

where $x_c(i)$ is a complex number representation of a first channel of the input signal, $x_c(j)$ is a complex number representation of a second channel of the input signal, ω is an angle of rotation, wherein the reversible complex butterfly is implemented via first a 0.25π multiple factorization reversible rotation of the pair of variables formed by the real and imaginary part of the two channels of the input signal, and then a multiple factorization reversible complex rotation ω of the second channel.

49. The method of claim 37, wherein the multiple factorization reversible transform is a multiple factorization reversible conjugated rotation implemented via:

$$\begin{bmatrix} x' \\ y' \end{bmatrix} = \begin{bmatrix} \cos\theta & -\sin\theta \\ -\sin\theta & -\cos\theta \end{bmatrix} \begin{bmatrix} x \\ y \end{bmatrix} = \begin{bmatrix} 1 & 0 \\ 0 & -1 \end{bmatrix} \begin{bmatrix} \cos\theta & -\sin\theta \\ \sin\theta & \cos\theta \end{bmatrix} \begin{bmatrix} x \\ y \end{bmatrix}$$

where θ is an angle of rotation,
x is a first channel of the input signal,
y is a second channel of the input signal,
x' is a first multiplexed channel of the input signal,
y' is a second multiplexed channel of the input signal
wherein the multiple factorization reversible conjugated rotation is implemented via first a multiple factorization reversible rotation, and then a reversal of the sign of an imaginary part.

50. The method of claim 37, wherein the multiple factorization reversible transform is at least one of a reversible modulated lapped transform, a reversible DCT, a reversible DST and a reversible FFT.

51. A computer readable medium storing computer executable components of a lossless data coder system comprising:
a multiple factorization reversible transform component that receives an input signal and provides an output of quantized coefficients corresponding to the input signal, the output of quantized coefficients being based, at least in part, upon a multiple factorization reversible transform that switches between multiple reversible forms based upon a reversible rotation parameter of the transform; and,
an entropy encoder component that digitally entropy encodes the quantized coefficients.

52. A lossless data coder system comprising:
means for receiving an input signal;
means for providing an output of quantized coefficients corresponding to the input signal, the output of quantized coefficients being based, at least in part, upon a multiple factorization reversible transform that switches between multiple reversible forms based upon a reversible rotation parameter of the transform so as to minimize quantization noise; and,
means for entropy encoding the quantized coefficients.

* * * * *